US007981583B2

(12) United States Patent
Sasaki et al.

(10) Patent No.: US 7,981,583 B2
(45) Date of Patent: Jul. 19, 2011

(54) BINDER RESIN FOR ELECTROSTATIC IMAGE DEVELOPING TONER, BINDER RESIN PARTICLE LIQUID DISPERSION FOR ELECTROSTATIC IMAGE DEVELOPING TONER, PRODUCTION METHOD OF ELECTROSTATIC IMAGE DEVELOPING TONER, ELECTROSTATIC IMAGE DEVELOPING TONER, ELECTROSTATIC IMAGE DEVELOPER, IMAGE FORMING METHOD AND IMAGE FORMING APPARATUS

(75) Inventors: Yuki Sasaki, Kanagawa (JP); Hirotaka Matsuoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 76 days.

(21) Appl. No.: 12/212,907

(22) Filed: Sep. 18, 2008

(65) Prior Publication Data
US 2009/0162778 A1 Jun. 25, 2009

(30) Foreign Application Priority Data
Dec. 20, 2007 (JP) ................. 2007-328905

(51) Int. Cl.
*G03G 9/16* (2006.01)
*G03G 13/20* (2006.01)
*G03G 15/08* (2006.01)
*C08G 63/02* (2006.01)
*C08L 67/02* (2006.01)

(52) U.S. Cl. ............. 430/109.4; 430/137.14; 430/124.1; 525/168; 528/272; 528/274; 524/601; 399/222

(58) Field of Classification Search ............... 430/109.4, 430/137.14, 124, 124.1; 525/168; 528/272, 528/274; 524/601; 399/222
See application file for complete search history.

(56) References Cited

U.S. PATENT DOCUMENTS
2007/0048646 A1 3/2007 Sasaki et al.
2007/0092822 A1 4/2007 Matsumura et al.
2007/0148579 A1 6/2007 Mera et al.

FOREIGN PATENT DOCUMENTS
| JP | A 11-313692 | 11/1999 |
| JP | A 2003-306535 | 10/2003 |
| JP | A 2005-154619 | 6/2005 |
| JP | A 2006-206860 | 8/2006 |
| JP | 2007-058074 | 3/2007 |
| JP | 2007-114627 | 5/2007 |
| JP | 2007-171757 | 7/2007 |

OTHER PUBLICATIONS

Dec. 22, 2009 Japanese Office Action for Application No. 2007-328905 (with translation).
Tanaka et al., "Synthesis of Polyesters by Emulsion Polycondensation Reaction in Water," *Polymer Journal*, vol. 35, No. 4, 2003, pp. 359-363.
Ishihara et al., "Direct Condensation of Carboxylic Acids with Alcohols Catalyzed by Hafnium(IV) Salts," *Science*, vol. 290, Nov. 10, 2000, pp. 1140-1142.

*Primary Examiner* — Duc Truong
(74) *Attorney, Agent, or Firm* — Oliff & Berridge, PLC

(57) ABSTRACT

A binder resin for an electrostatic image developing toner is obtained by polycondensation reaction of at least two polycarboxylic acids and at least one polyol, wherein the at least two polycarboxylic acids include at least one of a first specific polycarboxylic acid and a second specific polycarboxylic acid in an amount of from about 3 mol % to less than about 50 mol % based on a total amount of the at least two polycarboxylic acids, the binder resin includes a catalyst-derived metal in an amount of from about 0 ppm to about 10 ppm, and the binder resin has a glass transition temperature Tg of from about 45° C. to about 80° C.

21 Claims, No Drawings

BINDER RESIN FOR ELECTROSTATIC IMAGE DEVELOPING TONER, BINDER RESIN PARTICLE LIQUID DISPERSION FOR ELECTROSTATIC IMAGE DEVELOPING TONER, PRODUCTION METHOD OF ELECTROSTATIC IMAGE DEVELOPING TONER, ELECTROSTATIC IMAGE DEVELOPING TONER, ELECTROSTATIC IMAGE DEVELOPER, IMAGE FORMING METHOD AND IMAGE FORMING APPARATUS

CROSS-REFERENCE TO RELATED APPLICATIONS

This application is based on and claims priority under 35 USC 119 from Japanese Patent Application No. 2007-328905 filed on Dec. 20, 2007.

BACKGROUND

1. Technical Field

The present invention relates to a binder resin for an electrostatic image developing toner, a binder resin particle liquid dispersion for an electrostatic image developing toner, a production method of an electrostatic image developing toner, an electrostatic image developing toner, an electrostatic image developer, an image forming method and an image forming apparatus.

2. Related Art

With rapid spread of digitization technology, high image quality is recently demanded in the output such as print and copy in the office or publishing field. Meanwhile, demands for low energy and energy saving in corporate activities and activity result products are increasing so as to realize a sustainable society. To keep up with this trend, also in the image forming method by an electrophotographic process, electrostatic recording process or the like, it becomes necessary to save the electric power in the fixing step involving a large energy consumption or realize implementation of an activity with a low environmental load in the step of producing a product by using the material obtained. The countermeasure for the former includes more reduction in the toner fixing temperature. When the toner fixing temperature is lowered, in addition to power saving, the waiting time until the fixing member surface reaches the fixing possible temperature after turning on the power source, so-called warm-up time, can be shortened and the life of the fixing member can be prolonged.

As for the binder resin of a toner, a vinyl-based polymer has been heretofore widely used, but a vinyl-based polymer having a high molecular weight has a high softening temperature and the heat roller must be set to a high temperature so as to obtain a fixed image with excellent glossiness, which runs against energy saving.

On the other hand, a polyester resin has a rigid aromatic ring in the ring and in turn is flexible as compared with the vinyl-based polymer, and this enables setting low the molecular weight when the mechanical strength is the same. Also, design as a low-temperature fixing resin is advantageously easy in view of intertwining of molecular chains, limit molecular weight and the like. Therefore, polyester is being used as the binder resin for an energy-saving toner in many cases.

The polycondensation of a polyester usually requires a reaction for a long time of 10 hours or more at a high temperature exceeding 200° C. under highly reduced pressure with stirring by a large force and incurs massive energy consumption. In addition, a huge equipment investment is often required for obtaining durability of the reaction equipment.

As for the polyester binder resin, a noncrystalline polyester resin obtained by polycondensing mainly an aromatic polyvalent carboxylic acid (e.g., terephthalic acid, isophthalic acid), an aliphatic unsaturated carboxylic acid (e.g., fumaric acid, maleic acid), a diol having a bisphenol structure, and an alicyclic dial (e.g., aliphatic diol, cyclohexanedimethanol) has been heretofore used.

SUMMARY

According to an aspect of the invention, there is provided a binder resin for an electrostatic image developing toner, which is obtained by polycondensation reaction of at least two polycarboxylic acids and at least one polyol, wherein the at least two polycarboxylic acids include at least one of a polycarboxylic acid represented by formula (1) and a polycarboxylic acid represented by formula (2) in an amount of from about 3 mol % to less than about 50 mol % based on a total amount of the at least two polycarboxylic acids, the binder resin includes a catalyst-derived metal in an amount of from about 0 ppm to about 10 ppm, and the binder resin has a glass transition temperature Tg of from about 45° C. to about 80° C.:

  (1)

wherein each $A^1$ independently represents a methylene group, each $B^1$, which may be the same as or different from every other $B^1$, independently represents an aromatic hydrocarbon residue, each of $R^1$ and $R^{1'}$ independently represents a hydrogen atom or a monovalent hydrocarbon group, a sum of m and l is from 1 to 12, and n is from 1 to 3;

  (2)

wherein each $A^2$ independently represents a methylene group, each $B^2$, which may be the same as or different from every other $B^2$, independently represents an alicyclic hydrocarbon residue, each of $R^2$ and $R^{2'}$ independently represents a hydrogen atom or a monovalent hydrocarbon group, p is from 0 to 6, q is from 0 to 6, and r is from 1 to 3.

DETAILED DESCRIPTION

—Binder Resin for Electrostatic Image Developing Toner—

The binder resin for an electrostatic image developing toner of the present invention (may also be referred to as "toner resin" or "binder resin" hereinafter) is obtained by the polycondensation reaction of polycarboxylic acids and polyols, wherein from about 3 mol % to less than about 50 mol % of the polycarboxylic acids are represented by formula (1) and/or formula (2), the content of the catalyst-derived metal element is from about 0 ppm to about 10 ppm, and the glass transition temperature is from about 50° C. to about 80° C.:

  (1)

($A^1$: a methylene group, $B^1$: an aromatic hydrocarbon residue, $1 \leq m+1 \leq 12$, $1 \leq n \leq 3$, and $R^1$, $R^{1'}$ a hydrogen atom or a monovalent hydrocarbon group);

  (2)

($A^2$: a methylene group, $B^2$: an alicyclic hydrocarbon residue, $0 \leq p \leq 6$, $0 \leq q \leq 6$, $1 \leq r \leq 3$, and $R^2$, $R^{2'}$: a hydrogen atom or a monovalent hydrocarbon group).

As described above, studies on polycondensation of a polyester by a production process with a low environmental load are continuing. However, in order to allow for the progress of polycondensation at a low temperature, a limited monomer such as easily reactive monomer having a low activation energy must be used and this gives rise to problems that the achieved molecular weight is low, the thermal property can be hardly controlled, the reaction time is long and the cost rises.

As a result of intensive studies, it is found that a polycondensate which is heretofore producible only by using a metal catalyst because of low reactivity can be produced without using a metal catalyst. By this finding, characteristics required of a toner can be ensured and moreover, coloration or problems ascribable to by-products, unreacted products or the like can be suppressed.

The polycarboxylic acids and polyols which are polycondensation components for use in the present invention are described.

(Polycarboxylic Acids)

From about 3 mol % to less than about 50 mol % of the polycarboxylic acids for use in the present invention are composed of compounds (dicarboxylic acids) represented by formula (1) and/or formula (2). Incidentally, in the present invention, the term "carboxylic acid" means a carboxylic acid including its esterified product and acid anhydride.

(1)

($A^1$: a methylene group, $B^1$: an aromatic hydrocarbon residue, $1 \leq m+1 \leq 12$, $1 \leq n \leq 3$, and $R^1$, $R^{1'}$: a hydrogen atom or a monovalent hydrocarbon group).

(2)

($A^2$: a methylene group, $B^2$: an alicyclic hydrocarbon residue, $0 \leq p \leq 6$, $0 \leq r \leq 6$, $1 \leq q \leq 3$, and $R^2$, $R^{2'}$: a hydrogen atom or a monovalent hydrocarbon group).

Here, the monovalent hydrocarbon group represents an alkyl group, an alkenyl group, an alkynyl group, an aryl group, a hydrocarbon group or a heterocyclic group, and these groups each may have an arbitrary substituent. $R^1$, $R^{1'}$, $R^2$ and $R^{2'}$ each is preferably a hydrogen atom or a lower alkyl group, more preferably a hydrogen atom, a methyl group or an ethyl group, and most preferably a hydrogen atom.

Also, the aromatic hydrocarbon residue in formula (1) and the alicyclic hydrocarbon residue in formula (2) each may be substituted.

<Dicarboxylic Acid Represented by Formula (1)>

The dicarboxylic acid represented by formula (1) has at least one aromatic hydrocarbon residue $B^1$, but the structure thereof is not particularly limited. The aromatic hydrocarbon residue $B^1$ is a group obtained by removing two hydrogens from an aromatic hydrocarbon structure, and examples of the aromatic hydrocarbon structure include, but are not limited to, benzene, naphthalene, acenaphthylene, fluorene, anthracene, phenanthrene, tetracene, fluoranthene, pyrene, benzofluorene, benzophenanthrene, chrysene, triphenylene, benzopyrene, perylene, anthrathrene, benzonaphthacene, benzochrysene, pentacene, pentaphene and coronene skeletons. In these structures, a substituent may be further added.

The number of aromatic hydrocarbon residues $B^1$ contained in the dicarboxylic acid represented by formula (1) is from 1 to 3. If the number of aromatic hydrocarbon residues contained is less than 1, the polyester produced is deprived of non-crystallinity, whereas if it exceeds 3, not only synthesis of such a dicarboxylic acid is difficult, giving rise to reduction in the efficiency of cost or production but also reactivity decreases due to increase in the melting temperature or viscosity of the dicarboxylic acid represented by formula (1) or due to size or bulkiness of the dicarboxylic acid.

In the case where the dicarboxylic acid represented by formula (1) contains a plurality of aromatic hydrocarbon residues, the aromatic hydrocarbon residues may be directly bonded to each other or may take a structure where another skeleton such as saturated aliphatic hydrocarbon group intervenes therebetween. Examples of the former include a biphenyl skeleton, and examples of the latter include a bisphenol A skeleton, a benzophenone skeleton and a diphenylethene skeleton, but the present invention is not limited thereto.

The aromatic hydrocarbon residue $B^1$ suitably has a structure where the carbon number of the main skeleton is from C6 to C18. The carbon number of the main skeleton does not include the number of carbons contained in the functional group bonded to the main skeleton. Examples of the skeleton include benzene, naphthalene, acenaphthylene, fluorene, anthracene, phenanthrene, tetracene, fluoranthene, pyrene, benzofluorene, benzophenanthrene, chrysene, triphenylene and bisphenol A skeletons. Among these skeletons, preferred are benzene, naphthalene, anthracene and phenanthrene, and most preferred are benzene and naphthalene structures.

The carbon number of the main skeleton is preferably 6 or more, because the production of the monomer is easy. Also, the carbon number of the main skeleton is preferably 18 or less, because the molecular size of the monomer is appropriate and the reactivity does not decrease due to restricted molecular motion. Furthermore, the proportion of the reactive functional group in the monomer molecule is proper and advantageously, reduction in the reactivity does not occur.

The dicarboxylic acid represented by formula (1) contains at least one or more methylene groups $A^1$. The methylene group may be either linear or branched and, for example, a methylene chain, a branched methylene chain or a substituted methylene chain may be used. In the case of a branched methylene chain, the branched part is not limited in its structure and may have an unsaturated bond or may further have a branched or cyclic structure or the like.

The number of methylene groups $A^1$ is from 1 to 12 in terms of the total m+1 in the molecule. The total m+1 is preferably from 2 to 6, and it is more preferred that m and 1 are the same number. If m+1 is 0, that is, the dicarboxylic acid represented by formula (1) does not contain a methylene group, the compound comes to have a structure where an aromatic hydrocarbon residue is directly bonded to a carboxyl group at both ends, and in this case, the reaction intermediate formed by the catalyst and the dicarboxylic acid represented by formula (1) is resonance-stabilized and the reactivity decreases. Also, if m+1 exceeds 12, the linear moiety becomes excessively large for the dicarboxylic acid represented by formula (1) and the polymer produced may have properties of a crystalline polymer or the glass transition temperature Tg of the resin obtained may decrease.

The bonding site of the methylene group $A^1$ or carboxyl group to the aromatic hydrocarbon residue $B^1$ is not particularly limited and may be o-position, m-position or p-position.

Examples of the dicarboxylic acid represented by formula (1) include, but are not limited to, 1,4-phenylenediacetic acid, 1,4-phenylenedipropionic acid, 1,3-phenylenediacetic acid, 1,3-phenylenedipropionic acid, 1,2-phenylenediacetic acid and 1,2-phenylenedipropionic acid. Among these, 1,4-phenylenedipropionic acid, 1,3-phenylenedipropionic acid, 1,4-phenylenediacetic acid and 1,3-phenylenediacetic acid are preferred, and 1,4-phenylenediacetic acid and 1,3-phenylenediacetic acid are more suitable for a toner.

In the dicarboxylic acid represented by formula (1), various functional groups may be added to any site of the structure. Also, the carboxylic acid group as the polycondensation reactive functional group may be an acid anhydride, an acid esterified product or an acid chloride. However, an intermediate of an acid esterified product and a proton is readily stabilized and tends to inhibit the reactivity and therefore, a carboxylic acid, a carboxylic acid anhydride or a carboxylic acid chloride is suitably used.

<Dicarboxylic Acid Represented by Formula (2)>

The dicarboxylic acid represented by formula (2) contains an alicyclic hydrocarbon residue $B^2$. The alicyclic hydrocarbon residue is a group obtained by removing two hydrogens from an alicyclic hydrocarbon structure. The alicyclic hydrocarbon structure is not particularly limited and examples thereof include, but are not limited to, cyclopropane, cyclobutane, cyclopentane, cyclohexane, cycloheptane, cyclooctane, cyclononane, cyclodecane, cycloundecane, cyclododecane, cyclopropene, cyclobutene, cyclopentene, cyclohexene, cycloheptene, cyclooctene, norbornene, adamantane, diamantane, triamantane, tetramantane, iceane and twistane. In these compounds, a substituent may be added. Considering the stability of the structure or the size or bulkiness of the molecule, cyclobutane, cyclopentane, cyclohexane, norbornene and adamantane are preferred.

The number of the alicyclic hydrocarbon residues contained in this monomer is from 1 to 3. If the number of the alicyclic hydrocarbon residues contained is less than 1, the polyester produced is deprived of non-crystallinity, whereas if it exceeds 3, the reactivity decreases due to increase in the melting temperature of the dicarboxylic acid represented by formula (2) or due to size or bulkiness of the molecule.

In the case where the dicarboxylic acid represented by formula (2) contains a plurality of alicyclic hydrocarbon residues, the compound may take either a structure where the aromatic hydrocarbon residues are directly bonded to each other, or a structure where another skeleton such as saturated aliphatic hydrocarbon intervenes therebetween. Examples of the former include a dicyclohexyl skeleton, and examples of the latter include a hydrogenated bisphenol A skeleton, but the present invention is not limited thereto.

The alicyclic hydrocarbon residue is suitably a substance having a carbon number of C3 to C12. This carbon number of the main skeleton does not include the number of carbons contained in the functional group bonded to the main skeleton. Examples thereof include substances having a cyclopropane, cyclobutane, cyclopentane, cyclohexane, norbornene or adamantane skeleton. Among these skeletons, preferred are cyclobutane, cyclopentane, cyclohexane, norbornene and adamantane.

The dicarboxylic acid represented by formula (2) may contain a methylene group $A^2$ in its structure. The methylene group may be either linear or branched and, for example, a methylene chain, a branched methylene chain or a substituted methylene chain may be used. In the case of a branched methylene chain, the branched part is not limited in its structure and may have an unsaturated bond or may further have a branched or cyclic structure or the like.

As for the number of methylene groups $A^2$, p and r each is 6 or less. If either one or both of p and r exceed 6, the linear moiety becomes excessively large for the dicarboxylic acid represented by formula (2) and the polymer produced may have properties of a crystalline polymer or the glass transition temperature Tg may decrease.

The bonding site of the methylene group $A^2$ or carboxyl group to the alicyclic hydrocarbon residue $B^2$ is not particularly limited.

Examples of the dicarboxylic acid represented by formula (2) include, but are not limited to, 1,1-cyclopropanedicarboxylic acid, 1,1-cyclobutanedicarboxylic acid, 1,2-cyclobutanedicarboxylic acid, 1,1-cyclopentenedicarboxylic acid, 1,4-cyclohexanedicarboxylic acid, 1,3-cyclohexanedicarboxylic acid, 1,2-cyclohexanedicarboxylic acid, 1,2-cyclohexenedicarboxylic acid, norbornene-2,3-dicarboxylic acid and adamantanedicarboxylic acid. Among these, preferred are substances having a cyclobutane, cyclohexane or cyclohexane skeleton, more preferred are 1,3-cyclohexanedicarboxylic acid and 1,4-cyclohexanedicarboxylic acid.

In the dicarboxylic acid represented by formula (2), various functional groups may be added to any site of the structure. Also, the carboxylic acid group as the polycondensation reactive functional group may be an acid anhydride, an acid esterified product or an acid chloride. However, an intermediate of an acid esterified product and a proton is readily stabilized and tends to inhibit the reactivity and therefore, a carboxylic acid, a carboxylic acid anhydride or a carboxylic acid chloride is suitably used.

In the present invention, the compounds (dicarboxylic acids) represented by formula (1) and/or formula (2) are contained in an amount of about 3 mol % to less than about 50 mol % based on the entire polycarboxylic acid component. The compound represented by formula (1) and the compound represented by formula (2) may be used individually or in combination.

When the proportion of the compounds represented by formula (1) and/or formula (2) is less than about 50 mol %, heat resistance can be fully brought out and when the proportion is 3 mol % or more, reactivity at a low temperature can be obtained. The proportion is preferably from about 5 mol % to about 45 mol % (in the present invention, "from 5 mol % to 45 mol %" is sometimes referred to as "5 to 45 mol %" or "5 mol % to 45 mol %"; hereinafter the same), more preferably from about 10 mol % to about 40 mol %.

Also, when such a monomer having high reactivity (readily reactive monomer) is present in the system, this produces an effect of inducing a reaction with a monomer having low reactivity or insufficient meltability at a low temperature (poorly reactive monomer). The details thereof are not clearly known, but the poorly reactive monomer is considered to react from the initial stage of polymerization by virtue of the solvent effect or the like of the readily reactive monomer.

<Other Polycarboxylic Acids>

Other polycarboxylic acids used in combination with the polycarboxylic acids represented by formula (1) and/or formula (2) are described below. As for the polycarboxylic acid used in combination, one species may be used alone, or a plurality of species may be used in combination.

As for the polycarboxylic acid used in combination, a polyvalent carboxylic acid containing two or more carboxyl groups in one molecule may be used. Out of these carboxylic acids, a divalent carboxylic acid is a compound containing two carboxyl groups in one molecule, and examples thereof include oxalic acid, succinic acid, itaconic acid, glutaconic acid, glutaric acid, maleic acid, adipic acid, β-methyladipic acid, suberic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, malic acid, hexahydroterephthalic acid, malonic acid, pimelic acid, tartaric acid, mucic acid, phthalic acid, isophthalic acid, terephthalic acid, tetra-chlorophthalic acid, chlorophthalic acid, nitrophthalic acid, biphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, n-dodecylsuccinic acid, n-dodecenylsuccinic acid, isododecylsuccinic acid, isododecenylsuccinic acid, n-octylsuccinic acid and n-octenylsuccinic acid. Examples of the polyvalent carboxylic acid other than the divalent carboxylic acid include trimellitic acid, pyromellitic acid, naphthalenetricarboxylic acid, naphthalenetetracarboxylic acid, pyrenetricarboxylic acid, pyrenetetracarboxylic acid and citric acid.

Other examples include an acid anhydride, an acid chloride and an acid esterified product of these carboxylic acids, but the present invention is not limited thereto.

In the present invention, a polycarboxylic acid having a difference in the melting temperature (Tm) of less than about 100° C. from a Brønsted acid catalyst is preferably used. Here, the Brønsted acid is used as a polycondensation catalyst of a polycarboxylic acid and a polyol. The difference in the melting temperature is more preferably less than about 80° C.

Preferred examples of other polycarboxylic acids include polycarboxylic acids having an aromatic ring, an alicyclic ring, a crosslinked ring, a spiro ring or a heterocyclic ring. Specific examples of the polycarboxylic acid which is suitably used in the present invention include phthalic acids, naphthalic acid, pyromellitic acid, adamantanedicarboxylic acid, norbornenedicarboxylic acid, and anhydrides thereof. Among these, phthalic anhydride, adamantanedicarboxylic acid and norbornenedicarboxylic acid are more preferred, because the reactivity at a relatively low temperature is high and the obtained resin has good heat resistance.

Incidentally, an appropriate polycarboxylic acid is preferably selected and used according to the Brønsted acid catalyst used.

(Polyol)
<Compound Represented by Formula (3)>

The binder resin for an electrostatic image developing toner of the present invention is preferably obtained by the polycondensation reaction of polycarboxylic acids and polyols, where from about 3 mol % to about 100 mol % of the polyols are composed of compounds represented by the following formula (3):

$$HOX_hY_jX_kOH \quad (3)$$

(X: an alkylene oxide group, Y: a bisphenol skeleton group, $1 \leq h+k \leq 10$, and $1 \leq j \leq 3$).

The diol represented by formula (3) contains at least one bisphenol skeleton Y. The bisphenol skeleton is not particularly limited as long as it is a skeleton constituted by two phenol groups, and examples thereof include, but are not limited to, bisphenol A, bisphenol C, bisphenol E, bisphenol F, bisphenol P, bisphenol S and bisphenol Z. Preferred examples of the skeleton include bisphenol A, bisphenol C, bisphenol E, bisphenol F, bisphenol M, bisphenol P, bisphenol S and bisphenol Z, with bisphenol A, bisphenol S, bisphenol Z and bisphenol F being more preferred.

The number j of bisphenol skeletons is preferably from 1 to 3. When the number of bisphenol skeletons in the diol represented by formula (3) is in this range, the produced polyester advantageously comes to have properties of a noncrystalline polyester. Also, this is preferred not only in that the production is easy and practical in view of efficiency and cost but also in that the molecule size is appropriate and a suitable viscosity or melting temperature is obtained.

In the present invention, the diol represented by formula (3) preferably contains at least one alkylene oxide group. Examples of the alkylene oxide group include, but are not limited to, an ethylene oxide group, a propylene oxide group and a butylene oxide group. An ethylene oxide group and a propylene oxide are preferred.

The number h+k of alkylene oxide groups is preferably from 1 to 10 in one molecule. When the diol has an alkylene oxide group, delocalization of an electron due to resonance stabilization between a hydroxyl group and an aromatic ring in the bisphenol skeleton does not occur and the nucleophilic attack on the polycarboxylic acid by the diol represented by formula (3) is high, which advantageously brings about an increase of the molecular weight and good progress of the polymerization degree. On the other hand, when the number of alkylene oxide groups is 10 or less, this is advantageous not only in that the linear moiety in the diol has an appropriate length and the polyester produced comes to have properties of a noncrystalline polyester but also in that the number of reactive functional groups in the diol represented by formula (3) is appropriate and good reaction efficiency can be obtained.

From the standpoint of accelerating a uniform reaction, h and k are preferably the same number. Also, the number h+k of alkylene oxide groups is preferably 6 or less, and it is more preferred that the numbers h and k of alkylene oxide groups each is 2 or 1. In the case of having two or more alkylene oxide groups, one molecule may have two or more kinds of alkylene oxide groups.

Examples of the diol represented by formula (3) include, but are not limited to, a bisphenol A-ethylene oxide adduct (h+k is from 1 to 10), a bisphenol A-propylene oxide adduct (h+k is from 1 to 10), a bisphenol A-ethylene oxide propylene oxide adduct (h+k is from 2 to 10), a bisphenol Z-ethylene oxide adduct (h+k is from 1 to 10), a bisphenol Z-propylene oxide adduct (h+k is from 1 to 10), a bisphenol S-ethylene oxide adduct (h+k is from 1 to 10), a bisphenol S-propylene oxide adduct (h+k is from 1 to 10), a biphenol-ethylene oxide adduct (h+k is from 1 to 10), a bisphenol-propylene oxide adduct (h+k is from 1 to 10), a bisphenol F-ethylene oxide adduct (h+k is from 1 to 10), a bisphenol F-propylene oxide adduct (h+k is from 1 to 10), a bisphenol E-ethylene oxide adduct (h+k is from 1 to 10), a bisphenol E-propylene oxide adduct (h+k is from 1 to 10), a bisphenol C-ethylene oxide adduct (h+k is from 1 to 10), a bisphenol C-propylene oxide adduct (h+k is from 1 to 10), a bisphenol M-ethylene oxide adduct (h+k is from 1 to 10), a bisphenol M-propylene oxide adduct (h+k is from 1 to 10), a bisphenol P-ethylene oxide adduct (h+k is from 1 to 10) and a bisphenol P-propylene oxide adduct (h+k is from 1 to 10). Among these, preferred are a 1-mol ethylene oxide adduct of bisphenol A (h and k each is 1), a 2-mol ethylene oxide adduct of bisphenol A (h and k each is 2), a 1-mol propylene oxide adduct of bisphenol A (h and k each is 1), a 1-mol ethylene oxide 2-mol propylene oxide adduct of bisphenol A, a 1-mol ethylene oxide adduct of bisphenol S (h and k each is 1), a 1-mol propylene oxide adduct of bisphenol S (h and k each is 1), a 1-mol ethylene oxide adduct of bisphenol F (h and k each is 1), and a 1-mol propylene oxide adduct of bisphenol F (h and k each is 1).

The heat resistance and water resistance of the resin can be enhanced by containing both of these components (the compounds represented by formula (1) and/or formula (2) and the compounds represented by formula (3)).

As for the compound represented by formula (3), two or more kinds of monomers having different adducts may be blended, and an ethylene oxide propylene oxide adduct may be used, but a mixture of a monomer as an ethylene oxide adduct and a monomer as a propylene oxide adduct is preferably used.

In the diol components, when the molar ratio of an EO adduct to a PO adduct is from about 0.2:0.8 to about 0.8:0.2, appropriate properties as a binder resin for toner are brought out. A compound where the addition number is the same between an ethylene oxide adduct monomer and a propylene oxide adduct monomer and the above-described ratio is achieved by the blending ratio of respective monomers is preferred, and a compound where an ethylene oxide 1 mol adduct (h and k each is 1) and a propylene oxide 1 mol adduct (h and k each is 1) are mixed and used to give a ratio in the range above is more preferred.

In the case of using adducts in the above-described molar ratio range, when the blending ratio of PO which is originally a tertiary alcohol is in this range, the reactivity and properties described above all can be satisfied. This is considered to result because the high reactivity of the EO adduct induces the reaction of the PO adduct having low reactivity.

In the present invention, the diols represented by formula (3) are preferably contained in the polyols in an amount of about 3 mol % to about 100 mol %. When the content is 3 mol % or more, this is advantageous not only in that excellent low-temperature polycondensation property and good reactivity are obtained to allow for extension of the molecular weight and a polyester having a high polymerization degree can be produced but also in that the content of residual polycondensation components is small, as a result, the binder resin shows good powder flowability and a viscoelasticity or glass transition temperature suitable as a binder resin for a toner can be obtained.

The diols represented by formula (3) are preferably contained in an amount of from about 15 mol % to about 100 mol %, more preferably from about 30 mol % to about 100 mol %.

<Other Polyols>

In the present invention, another polyol may be used alone or together with the polyol represented by formula (3). One species of other polyols may be used alone, or two or more species thereof may be used in combination.

As for the polyol (polyhydric alcohol), a polyol containing two or more hydroxyl groups in one molecule may be used. Out of these polyols, the divalent polyol (diol) is a compound having two hydroxyl groups in one molecule, and examples thereof include ethylene glycol, diethylene glycol, triethylene glycol, propylene glycol, butanediol, butenediol, neopentyl glycol, pentane glycol, hexane glycol, cyclohexanediol, cyclohexanedimethanol, octanediol, nonanediol, decanediol, dodecanediol, dipropylene glycol, polyethylene glycol, polypropylene glycol, and polytetramethylene glycol. Examples of the polyol other than the divalent polyol include glycerin, pentaerythritol, hexamethylolmelamine, hexaethylolmelamine, tetramethylolbenzoguanamine and tetraethylolbenzoguanamine.

Among these, in view of low-temperature reactivity or thermal properties, ethylene glycol, cyclohexanedimethanol, glycerin and pentaerythritol are preferred, and cyclohexanedimethanol is more preferred.

In the present invention, a polyol having a difference in the melting temperature (Tm) of less than about 100° C. from a Brønsted acid catalyst is preferably used. Here, the Brønsted acid is used as a polycondensation catalyst of a polycarboxylic acid and a polyol. The difference in the melting temperature is more preferably less than about 80° C.

An appropriate polyol is preferably selected and used according to the Brønsted acid catalyst used.

Furthermore, in the present invention, a hydroxy acid may be contained. Examples thereof include, but are not limited to, tartronic acid, leucine acid, mevalonic acid, pantoic acid, ricinoleic acid, ricinelaidic acid, cerebronic acid, quinic acid, shikimic acid, salicylic acid, creosotic acid (homosalicylic acid, hydroxy(methyl)benzoic acid), vanillic acid, syringic acid, a dihydroxybenzoic acid derivative, pyrocatechuic acid, resorcylic acid, protocatechuic acid, gentisic acid, orsellinic acid, a trihydroxybenzoic acid derivative, gallic acid, mandelic acid, benzilic acid, atrolactic acid, melilotic acid, phloretic acid, coumaric acid, umbellic acid, caffeic acid, ferulic acid, and sinapic acid.

(Catalyst)

In the present invention, a catalyst is preferably used at the polycondensation reaction.

<Brønsted Acid Catalyst>

The binder resin for an electrostatic image developing toner of the present invention preferably has a Brønsted acid catalyst. That is, the binder resin for an electrostatic image developing toner of the present invention is preferably a resin obtained by the polycondensation reaction of a polycarboxylic acid and a polyol (in the present invention, a polycarboxylic acid and a polyol are sometimes collectively referred to as the polycondensation component) by using a Brønsted acid catalyst as the catalyst.

In the present invention, the difference in the melting temperature (Tm) between the Brønsted acid catalyst and the polycarboxylic acid and/or polyol is preferably less than about 100° C. The difference in the melting temperature (Tm) is more preferably less than about 80° C.

When the difference in the melting temperature (Tm) between the Brønsted acid catalyst used and the polycarboxylic acid and/or polyol as the polycondensation component is less than 100° C., a polycondensation component (monomer) having low reactivity, of which polycondensation at a low temperature is conventionally difficult, can be reacted and this is preferred. The details of the operation mechanism are not clearly known, but it may be presumed that when the difference between the melting temperature (Tm) of a Brønsted acid and the melting temperature (Tm) of a polycondensation component in the system is small, good diffusion or mixing property is obtained by virtue of a solvent effect and a less time lag in dissolution of polycondensation components, and therefore, a polycondensation component having poor reactivity and/or a relatively high melting temperature and being difficult to polycondense at a low temperature is introduced into a polycondensate from the initial stage of reaction. That is, in the present invention, to perform the polycondensation, the temperature causing a change from solid to liquid in the process of elevating the temperature is particularly important. Thus, the difference in the melting temperature (Tm) is preferably less than about 100° C., because a uniform reaction proceeds in the reaction system. In this calculation, the melting temperature of a substance having a melting temperature of 0° C. or less is dealt as 0° C.

The expression "the difference in the melting temperature between the Brønsted acid catalyst and the polycarboxylic acid and/or polyol is less than about 100° C." as used herein means that the difference in the melting temperature between the Brønsted acid catalyst and the polycondensation component accounting for a proportion of more than about 40 mol % based on the total molar number of polycarboxylic acids and polyols as polycondensation components is less than about 100° C. In other words, a polycondensation component having a melting temperature difference of about 100° C. or more may be contained in a small amount. The proportion above is preferably about 50 mol % or more, more preferably about 60 mol % or more, still more preferably 65 mol % or more.

Examples of the Brønsted acid-based catalyst include, but are not limited to, an alkylbenzenesulfonic acid such as dodecylbenzenesulfonic acid, isopropylbenzenesulfonic acid and comphorsulfonic acid, an alkylsulfonic acid, an alkyldisulfonic acid, an alkylphenolsulfonic acid, an alkylnaphthalenesulfonic acid, an alkyltetralinsulfonic acid, an alkylallylsulfonic acid, a petroleum sulfonic acid, an alkylbenzimidazolesulfonic acid, a higher alcohol ether sulfonic acid, an alkyldiphenylsulfonic acid, a higher fatty acid sulfuric acid ester such as monobutyl-phenylphenol sulfate, dibutyl-phenylphenol sulfate and dodecyl sulfate, a higher alcohol sulfuric acid ester, a higher alcohol ether sulfuric acid ester, a higher fatty acid amide alkylol sulfuric acid ester, a higher fatty acid amide alkylated sulfuric acid ester, a naphthenyl alcohol sulfuric acid, a sulfated fat, a sulfosuccinic acid ester, various fatty acids, a sulfonated higher fatty acid, a higher alkylphosphoric acid ester, a resin acid, a resin acid alcohol sulfuric acid, a naphthenic acid, a niobic acid, and salt compounds of all of these acids. Such a catalyst may have a functional group in the structure. A plurality of these catalysts may be used in combination, if desired. The Brønsted acid-based catalyst which is preferably used includes a dodecylbenzenesulfonic acid, a pentadecylbenzenesulfonic acid, an octadecylbenzenesulfonic acid, a p-toluenesulfonic acid, derivatives thereof, and the like.

<Other Catalysts>

Another polycondensation catalyst commonly used may also be used alone or together with the above-described catalyst. Specific examples of other catalysts include a metal catalyst, a hydrolase-type catalyst and a basic catalyst.

[Metal Catalyst]

Examples of the metal catalyst include, but are not limited to, an organic tin compound, an organic titanium compound, an organic tin halide compound and a rare earth metal catalyst.

Specific examples of the effective rare earth-containing catalyst include those containing scandium (Sc), yttrium (Y), lanthanum (La) as lanthanoid element, cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu). In particular, those having an alkylbenzenesulfonate, alkylsulfuric acid ester salt or triflate structure are effective. Examples of the structural formula of triflate include $X(OSO_2CF_3)_3$, wherein X is a rare earth element. Above all, X is preferably scandium (Sc), yttrium (Y), ytterbium (Yb) or samarium (Sm).

The lanthanoid triflate is described in detail in *Journal of Synthetic Organic Chemistry*, Japan, Vol. 53, No. 5, pp. 44-54.

In the case of using a metal catalyst as the catalyst, the content of the catalyst-derived metal in the obtained resin is made to be about 10 ppm or less. That is, in the binder resin for an electrostatic image developing toner of the present invention, the content of the catalyst-derived metal element is from about 0 ppm to about 10 ppm, preferably about 8 ppm or less, more preferably about 5 ppm or less. Accordingly, a metal catalyst is preferably not used or even if used, the metal catalyst is preferably used in a very small amount.

If the content of the catalyst-derived metal element exceeds 10 ppm, when an electrostatic image developing toner image produced using the resin is stored for a long time under specific conditions and moisture in air adheres to the toner, the electric resistance value of the toner particle decreases due to the presence of a residual metal and in turn, the amount of triboelectric charge decreases to cause fogging. Furthermore, the polymerization temperature is relatively high and this incurs coloration of the resin and reduction in the color reproducibility.

The amount of the metal in the binder resin for an electrostatic image developing toner can be measured by various analysis methods such as fluorescent X-ray analysis and ICP (inductively coupled plasma) emission spectrometry. The catalyst-derived metal content as used herein means the total amount of titanium, tin, germanium, manganese, antimony and rare earth metal elements.

[Hydrolase-Type Catalyst]

The hydrolase-type catalyst is not particularly limited as long as it catalyzes an ester synthesis reaction. Examples of the hydrolase for use in the present invention include an esterase classified into EC (enzyme code) group 3.1 (see, for example, Maruo and Tamiya (supervisors), *Koso Handbook* (*Handbook of Enzyme*), Asakura-Shoten (1982)) such as carboxyesterase, lipase, phospholipase, acetylesterase, pectinesterase, cholesterol esterase, tannase, monoacylglycerol lipase, lactonase and lipoprotein lipase; a hydrolase classified into EC group 3.2 acting on a glycosyl compound, such as glucosidase, galactosidase, glucuronidase and xylosidase; a hydrolase classified into EC group 3.3 such as epoxide hydrase; a hydrolase classified into EC group 3.4 acting on a peptide bond, such as aminopeptidase, chymotrypsin, trypsin, plasmin and subtilisin; and a hydrolase classified into EC group 3.7, such as phloretin hydrase.

Among those esterases, an enzyme of hydrolyzing a glycerol ester and isolating a fatty acid is called a lipase. The lipase is advantageous in that, for example, this enzyme shows high stability in an organic solvent, catalyzes an ester synthesis reaction with good yield and is inexpensive. Accordingly, from the aspect of yield and cost, a lipase is preferably used also in the present invention.

Lipases of various origins may be used, but preferred examples thereof include a lipase obtained from micro-organisms of *Pseudomonas* group, *Alcaligenes* group, *Achromobacter* group, *Candida* group, *Aspergillus* group, *Rhizopus* group and *Mucor* group, a lipase obtained from plant seeds, and a lipase obtained from animal tissues, and further include pancreatin and steapsin. Among these, preferred is a lipase-derived in microorganisms of *Pseudomonas* group, *Candida* group and *Aspergillus* group.

[Basic Catalyst]

Examples of the basic catalyst include, but are not limited to, a general organic base compound, a nitrogen-containing basic compound, and a tetraalkylphosphonium or tetraarylphosphonium hydroxide such as tetrabutylphosphonium hydroxide. Examples of the organic base compound include ammonium hydroxides such as tetra-methylammonium hydroxide and tetraethylammonium hydroxide; and examples of the nitrogen-containing basic compound include amines (e.g., triethylamine, dibenzylmethylamine), pyridine, methylpyridine, methoxypyridine, quinoline, imidazole, a hydroxide, hydride or amide of alkali metals (e.g., sodium, potassium, lithium, cesium) or alkaline earth metals (e.g., calcium, magnesium, barium), and a salt of an alkali or alkaline earth metal with an acid, such as carbonate, phosphate, borate and carboxylate, or with a phenolic hydroxyl group. Other examples include a compound with an alcoholic hydroxyl group, and a chelate compound with acetylacetone, but the present invention is not limited thereto.

The total amount of the catalyst added is preferably from 0.01 to 5 mol %, more preferably from 0.05 to 1 mol %, based on the polycondensation component, and one species or a plurality of species may be added at the above-described proportion.

(Property of Resin for Electrostatic Image Developing Toner)

<Glass Transition Temperature>

The binder resin for an electrostatic image developing toner of the present invention is preferably a noncrystalline polyester resin, because this can be suitably used as a binder resin for an electrostatic image developing toner.

The binder resin for an electrostatic image developing toner of the present invention has a glass transition temperature (Tg) of about 45° C. to about 80° C. If the glass transition temperature (Tg) is less than 45° C., the resin is readily fusion-bonded to each other and this may incur reduction in the toner flowability, generation of hot offset, or worsening of image strength, whereas if the glass transition temperature (Tg) exceeds 80° C., satisfactory melting is not obtained at the toner fixing and the minimum fixing temperature rises, failing in obtaining good low-temperature fixability. The glass transition temperature (Tg) is preferably from about 50° C. to about 70° C., more preferably from about 50° C. to about 65° C.

The glass transition temperature can be measured by a known method, for example, by the method prescribed in ASTM D3418-82 (DSC method).

The "crystalline" as denoted in the "crystalline resin" means that the differential scanning calorimetry (DSC) shows not a stepwise change in the heat absorption but shows a distinct endothermic peak, and specifically means that the half-value width of the endothermic peak when measured at a temperature rising rate of 10° C./min is within 15° C. On the other hand, when the half-value width of the endothermic peak exceeds 15° C. or a distinct endothermic peak is not observed, this means that the resin is noncrystalline (amorphous) The DSC glass transition temperature of the noncrystalline resin is measured, for example, by a differential scanning calorimeter (DSC-50) manufactured by Shimadzu Corporation equipped with an automatic tangent processing system in accordance with ASTM D3418. The measuring conditions are as follows.
Specimen:
From 3 to 15 mg, preferably from 5 to 10 mg.
Measuring Method:
The specimen is placed on an aluminum pan and a blank pan is used as control.
Temperature Curve:
Temperature Rise I (from 20° C. to 180° C., temperature rise rate: 10° C./min).

The glass transition temperature is measured from the endothermic curve measured at the temperature rise in the temperature curve above. The glass transition temperature is a temperature at which the differential value of the endothermic curve becomes maximum.
<Molecular Weight>

In order to impart suitability for a toner to the noncrystalline binder resin produced in the present invention, the weight average molecular weight is preferably from about 5,000 to about 80,000, more preferably from about 7,000 to abotu 50,000. The weight average molecular weight is preferably 5,000 or more, because not only the powder flowability at an ordinary temperature is good and the toner is free from blocking but also the cohesive force as a toner binder resin is high and reduction in the hot offset property is not caused. Also, the weight average molecular is preferably about 80,000 or less, because good performance in terms of hot offset property and good minimum fixing temperature are obtained and the time or temperature required for the polycondensation is proper to ensure high production efficiency.

The weight average molecular weight is a value obtained by measuring the molecular weight of a tetrahydrofuran (THF) soluble portion by gel permeation chromatography (GPC). In the present invention, the molecular weight of the binder resin for an electrostatic image developing toner is obtained by measuring a THF soluble material in a THF solvent with use of TSK-GEL, GMH (produced by Tosoh Corp.) or the like and calculating the molecular weight based on the molecular weight calibration curve produced from a monodisperse polystyrene standard sample.

(Production Method of Binder Resin for Electrostatic Image Developing Toner)

The binder resin for an electrostatic image developing toner of the present invention is preferably obtained by polycondensing the above-described polycarboxylic acids and polyols, and the polycondensation reaction is preferably performed in the presence of a catalyst (preferably a Brønsted acid catalyst).

In the present invention, the binder resin can be obtained even when the polycondensation reaction is performed at a temperature lower than the conventional reaction temperature. The reaction temperature is preferably from 70 to 180° C., more preferably from 90 to 170° C.

The reaction temperature is preferably 90° C. or more, because reduction in the reactivity due to decrease in the monomer solubility or catalytic activity does not occur and increase of the molecular weight is not suppressed. Also, the reaction temperature is preferably 180° C. or less, because the binder resin can be produced with low energy and, for example, coloration of the resin or decomposition of the produced polyester can be suppressed.

The polycondensation reaction may be performed by an ordinary polycondensation method such as bulk polymerization, emulsion polymerization, in-water polymerization (e.g., suspension polymerization), solution polymerization and interface polymerization, and bulk polymerization is preferably employed. The reaction may be performed under atmospheric pressure, but in the case of intending to obtain, for example, a polyester having a high molecular weight, general conditions such as reduced pressure and nitrogen stream may be employed.

In the present invention, the polycondensation step may involve a polymerization reaction of the polycondensation component described above, that is, polycarboxylic acid and polyol, with a previously prepared prepolymer. The prepolymer is not limited so long as it is a polymer capable of dissolving in or uniformly mixing with the above-described monomers.

Furthermore, the binder resin of the present invention may have a homopolymer of the polycondensation component above, a copolymer combining two or more monomers including the above-described polymerizable component, a mixture or graft polymer thereof, a partly branched or crosslinked structure, or the like.

—Electrostatic Image Developing Toner—

The electrostatic image developing toner of the present invention is not particularly limited as long as it contains the above-described binder resin for an electrostatic image developing toner.

(Production Method of Electrostatic Image Developing Toner)

The electrostatic image developing toner (in the present invention, sometimes simply referred to as a "toner") can be produced by a mechanical production process such as melt-kneading pulverization method or a so-called chemical production process where a binder resin particle liquid dispersion for an electrostatic image developing toner (in the present invention, sometimes referred to as a "binder resin particle liquid dispersion" or a "resin particle liquid dispersion") is produced using the polyester above and a toner is produced from the resin particle liquid dispersion.
<Melt-Kneading Method>

When a toner is produced using the binder resin of the present invention by a mechanical production process such as melt-kneading method, good dispersibility or pulverization property of a pigment or the like is attained. This is considered to result because a polycondensation component having high reactivity at a low temperature is contained and the polycondensation can be performed at a temperature lower than that of conventional polycondensation, which enables less production of a by-product or an unreacted product and production of a binder resin having uniform physical properties.

In the case of producing a toner by a melt-kneading pulverization method, the binder resin of the present invention produced as above is preferably stirred and mixed with other toner raw materials in a Henschel mixer, a super mixer or the like in advance of the melt kneading. At this time, the capacity of stirrer, the rotation speed of stirrer, the stirring time and the like must be selected in combination.

The stirred product of the binder resin for a toner and other toner raw materials is then kneaded in the melted state by a known method. Kneading by a single-screw or multiple-screw extruder is preferred, because the dispersibility is enhanced. At this time, in the kneading apparatus, the number of kneading screw zones, the cylinder temperature, the kneading speed and the like all are preferably set and controlled to appropriate values. Out of the control factors at the kneading, the rotation number of kneader, the number of kneading screw zones and the cylinder temperature particularly have a great effect on the kneaded state. In general, the rotation number is preferably from 300 to 1,000 rpm and as for the number of kneading screw zones, kneading is more successfully performed using a multi-stage zone such as two-stage screw, rather than a one-stage zone. The cylinder preset temperature is preferably determined according to the softening temperature of the noncrystalline polyester working out to the main component of the binder resin and usually, this temperature is preferably on the order of −20 to +100° C. of the softening temperature. A cylinder preset temperature in this range is preferred not only in that satisfactory kneading-dispersion is obtained and aggregation does not occur but also in that kneading shear is applied to ensure sufficient dispersion and at the same time, cooling after kneading is easy.

The kneaded product after melt-kneading is thoroughly cooled and then pulverized by a known method such as mechanical pulverization method (e.g., ball mill, sand mill, hammer mill) or airflow pulverization method. In the case where satisfactory cooling is not obtained in a usual manner, a cooling or freeze pulverization method may also be selected.

For the purpose of controlling the particle size distribution of the toner, the toner after pulverization is sometimes classified. Classification has an effect of enhancing the toner fixability or image quality by removing particles having an improper diameter.

<Chemical Production Process (Aggregation-Coalescence Method)>

On the other hand, to cope with recent demands for high image quality, many chemical production processes of a toner are employed as a technique for realizing a small diameter of the toner and a low-energy production process. As for the chemical production process of a toner using the binder resin for a toner of the present invention, a general-purpose production process may be used, but an aggregation-coalescence method is preferred. The aggregation-coalescence method is a known aggregation method of dispersing a binder resin in an aqueous medium to produce a latex and aggregating (associating) it together with other toner raw materials.

Examples of the aqueous medium include water such as distilled water and ion-exchanged water, and alcohols such as methanol and ethanol. Among these, water such as distilled water and ion-exchanged water is preferred. One of these mediums may be used alone, or two or more thereof may be used in combination.

The aqueous medium may contain a water-miscible organic solvent. Examples of the water-miscible organic solvent include acetone and acetic acid.

The method for dispersing the binder resin produced as above in an aqueous medium is not particularly limited and may be selected from known methods such as forced emulsification method, self-emulsification method and phase-inversion emulsification method. Among these, a self-emulsification method and a phase-inversion emulsification method are preferred in consideration of energy required for emulsification, controllability of the particle diameter of the emulsified product obtained, safety and the like.

The self-emulsification method and phase-inversion emulsification method are described in *Chobiryushi Polymer no Oyo Gijutsu (Applied Technology of Ultrafine Particulate Polymer)*, CMC. As for the polar group used in the self-emulsification method, a carboxyl group, a sulfone group or the like may be used, but in the case of applying self-emulsification to the noncrystalline polyester binder resin for a toner in the present invention, a carboxyl group is preferred.

A toner controlled in the toner particle diameter and distribution can be produced using a so-called latex, that is, a binder resin liquid dispersion produced as above, by employing an aggregation (coalescence) method. More specifically, the latex prepared as above is mixed with a colorant particle liquid dispersion and a releasing agent particle liquid dispersion, an aggregating agent is added to cause hetero-aggregation and thereby form an aggregate particle having a toner size, and the aggregate particles are fused together and coalesced under heating to a temperature higher than the glass transition temperature or melting temperature of the binder resin particle, then washed and dried, whereby the above-described toner can be obtained. According to this production process, the shape of the toner can be controlled over a range from amorphous to spherical by selecting the heating temperature conditions.

After the completion of the step of fusing together and coalescing aggregate particles, the toner particle may be arbitrarily passed through a washing step, a solid-liquid separation step and a drying step to obtain a desired toner. In view of chargeability, the washing step is preferably performed by thorough displacement and washing with ion-exchanged water. The solid-liquid separation step is not particularly limited but in view of productivity, suction filtration, pressure filtration or the like is preferably used. The drying step is also not particularly limited, but, for example, freeze drying, flash jet drying, fluidized drying and vibration-type fluidized drying are preferred in view of productivity.

[Aggregating Agent]

As for the aggregating agent, other than the surfactant, an inorganic salt or a divalent or higher valent metal salt may be suitably used. In particular, when a metal salt is used, this is preferred in view of aggregation control and toner chargeability. The metal salt compound used for aggregation is obtained by dissolving a general inorganic metal compound or a polymer thereof in a resin particle liquid dispersion. The metal element constituting the inorganic metal salt is preferably a metal element having a divalent or higher electric charge belonging to Groups 2A, 3A, 4A, 5A, 6A, 7A, 8, 1B, 2B and 3B of the Periodic Table (long period), and the metal element is sufficient if dissolves in the form of ion in the aggregated system of resin particles. Specific preferred examples of the inorganic metal salt include a metal salt such as calcium chloride, calcium nitrate, barium chloride, magnesium chloride, zinc chloride, aluminum chloride and aluminum sulfate, and an inorganic metal salt polymer such as polyaluminum chloride, polyaluminum hydroxide and calcium polysulfide.

Among these, an aluminum salt and a polymer thereof are more preferred. In general, in order to obtain a sharper particle size distribution, the valence of the inorganic metal salt is preferably divalence than monovalence, and trivalence or greater valence than divalence. When the valence is the same, a polymer type, that is, an inorganic metal salt polymer, is more preferred.

<Other Components Used in Electrostatic Image Developing Toner>

In the present invention, one or a combination of a plurality of known additives may be blended, if desired, within the range not affecting the effects of the present invention. Examples of the additive include a flame retardant, a flame retardant aid, a gloss agent, a waterproof agent, a water repellent, an inorganic filler (surface modifier), are leasing agent, an antioxidant, a plasticizer, a surfactant, a dispersant, a lubricant, a filler, an extender pigment, a binder and a charge control agent. These additives may be blended in any step during the production of an electrostatic image developing toner.

When emulsion-dispersing such an additive in an aqueous medium, each material above is emulsion-dispersed in an aqueous medium by using, for example, mechanical shear or ultrasonic wave. At this emulsion dispersion, a surfactant, a polymer dispersant, an inorganic dispersant and the like may be added to the aqueous medium, if desired.

Also, the above-described catalyst or the below-described polymerization initiator may be previously added to an aqueous medium before emulsion-dispersing an oil phase in the aqueous medium or may be added after emulsion-dispersing an oil phase such as binder resin.

[Other Binder Resins]

In the present invention, the binder resin for an electrostatic image developing toner of the present invention may be used in combination with other binder resins.

The binder resin used in combination includes a resin obtained by polymerizing a crystalline polyester resin or a radical polymerizable compound and is preferably a resin obtained by polymerizing a radical polymerizable monomer.

In the case of producing the toner by an aggregation-coalescence method, the binder resin for an electrostatic image developing toner of the present invention is dispersed in an aqueous medium, a radical polymerizable monomer and if desired, additives such as polymerization initiator and surfactant are added and dispersed, and a radical polymerization reaction is allowed to proceed, whereby the resin (polymer) may be obtained. Also, after a radical polymerizable compound is polymerized by suspension polymerization, emulsion polymerization or the like to produce a resin particle liquid dispersion, this resin particle liquid dispersion may be used by mixing it with the resin particle liquid dispersion of the present invention.

Specific examples of the radical polymerizable monomer used herein include vinyl aromatics such as styrene, α-substituted styrene (e.g., α-methylstyrene, α-ethylstyrene), nucleus substituted styrene (e.g., m-methylstyrener p-methylstyrene, 2,5-dimethylstyrene), and nucleus substituted halogenated styrene (e.g., p-chlorostyrene, p-bromostyrene, dibromostyrene); unsaturated carboxylic acids such as (meth)acrylic acid (the term "(meth)acrylic" means acrylic and methacrylic, hereinafter the same), crotonic acid, maleic acid, fumaric acid, citraconic acid and itaconic acid; unsaturated carboxylic acid esters such as methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, glycidyl (meth)acrylate and benzyl (meth)acrylate; unsaturated carboxylic acid derivatives such as (meth)acrylaldehyde, (meth)acrylonitrile and (meth)acrylamide; N-vinyl compounds such as N-vinylpyridine and N-vinylpyrrolidone; vinyl esters such as vinyl formate, vinyl acetate and vinyl propionate; halogenated vinyl compounds such as vinyl chloride, vinyl bromide and vinylidene chloride; N-substituted unsaturated amides such as N-methylolacrylamide, N-ethylolacrylamide, N-propanolacrylamide, N-methylolmaleinamide acid, N-methylolmaleinamide acid ester, N-methylolmaleimide and N-ethylolmaleimide; conjugated dienes such as butadiene and isoprene; polyfunctional vinyl compounds such as divinylbenzene, divinylnaphthalene and divinylcyclohexane; and polyfunctional acrylates such as ethylene glycol di(meth)acrylate, diethylene glycol di(meth)acrylate, propylene glycol di(meth)acrylate, tetramethylene glycol di(meth)acrylate, neopentyl glycol di(meth)acrylate, hexamethylene glycol di(meth)acrylate, trimethylolpropane di(meth)acrylate, trimethylolpropane tri(meth)acrylate, glycerol di(meth)acrylate, glycerol tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, sorbitol tri(meth)acrylate, sorbitol tetra(meth)acrylate, sorbitol penta(meth)acrylate and sorbitol hexa(meth)acrylate. Out of these monomers, N-substituted unsaturated amides, conjugated dienes, polyfunctional vinyl compounds and polyfunctional acrylates can cause a crosslinking reaction in the polymer produced. One of these monomers may be used alone, or some may be used in combination.

[Polymerization Initiator]

As for the polymerization method of the polymerizable compound, a known polymerization method such as a method using a polymerization initiator, a self-polymerization method under heat or a method using ultraviolet irradiation may be employed. A method using a polymerization initiator is preferred, and in the case of using a radical polymerizable compound as the polymerizable compound, a radical polymerization initiator is preferably used. The radical polymerization initiator includes an oil-soluble initiator and a water-soluble initiator, and either polymerization initiator may be used.

Specific examples thereof include azobisnitriles such as 2,2'-azobis(2-methylpropionitrile), 2,2'-azobis(2-methylbutyronitrile), 2,2'-azobisisobutyronitrile, 2,2'-azobis(2,4-dimethylvaleronitrile), 2,2'-azobis(2,4-dimethyl-4-methoxyvaleronitrile), 1,1'-azobis(cyclohexanecarbonitrile) and 2,2'-azobis(2-amidinopropane) hydrochloride; organic peroxides such as diacyl peroxide (e.g., acetyl peroxide, octanoyl peroxide, 3,5,5-trimethylhexanoyl peroxide, decanoyl peroxide, lauroyl peroxide, benzoyl peroxide), dialkyl peroxide (e.g., di-tert-butyl peroxide, tert-butyl-α-cumyl peroxide, dicumyl peroxide), peroxy ester (e.g., tert-butyl peroxyacetate, α-cumyl peroxypivalate, tert-butyl peroxyoctoate, tert-butyl peroxyneodecanoate, tert-butyl peroxylaurate, tert-butyl peroxybenzoate, di-tert-butyl peroxyphthalate, di-tert-butyl peroxyisophthalate), hydroperoxide (e.g., tert-butyl hydroperoxide, 2,5-dimethylhexane-2,5-dihydroperoxide, cumene hydroperoxide, diisopropylbenzene hydroperoxide) and peroxy carbonate (e.g., tert-butyl peroxyisopropylcarbonate); inorganic peroxides such as hydrogen peroxide; and persulfates such as potassium persulfate, sodiumpersulfate and ammonium persulfate. Also, a redox polymerization initiator may be used in combination.

The polymerization initiator may be added to an oil phase but may also be added to an aqueous medium. Before emulsion dispersion, the polymerization initiator may be added to either an oil phase or an aqueous medium or may be added to both. The polymerization initiator may also be preferably added after emulsion dispersion.

Above all, it is preferred that an oil phase is emulsion-dispersed in an aqueous medium and the polymerization initiator is then added.

The content of the other binder resin in the binder resin is determined according to the physical properties of the binder resin of the present invention and the resin used in combination. The content of the resin used in combination is preferably 85 wt % or less, more preferably from 0 to 80 wt %. Within this range, the properties of the resin of the present invention can be brought out as a toner.

[Charge Control Agent]

As for the internal additive, various charge control agents commonly used, such as quaternary ammonium salt compound and nigrosine-based compound, may be used as the charge control agent, but in view of stability at the production and less contamination by waste water, a material hardly soluble in water is preferred.

[Releasing Agent]

Examples of the releasing agent which can be used include low molecular weight polyolefins such as polyethylene, polypropylene and polybutene; silicones having a softening temperature at which softening occurs under heat; fatty acid amides such as oleic acid amide, erucic acid amide, ricinoleic acid amide and stearic acid amide; an ester wax; a vegetable wax such as carnauba wax, rice wax, candelilla wax, Japan wax and jojoba oil; an animal wax such as bees wax; a mineral or petroleum wax such as montan wax, ozokerite, ceresin, paraffin wax, microcrystalline wax and Fischer-Tropsch wax; and a modified product thereof.

Such a wax is dispersed in water together with an ionic surfactant and a polymer electrolyte such as polymer acid or polymer base, and pulverized under heating to a temperature higher than the melting temperature in a homogenizer or pressure jet-type disperser capable of applying strong shear, whereby a liquid dispersion of particles of 1 μm or less can be produced.

[Flame Retardant, Flame Retardant Aid]

Examples of the flame retardant and flame retardant aid include, but are not limited to, a bromine-based flame retardant already used in general, antimony trioxide, magnesium hydroxide, aluminum hydroxide and ammonium polyphosphate.

As for the coloring component (colorant), any known pigment or dye may be used. Specific examples thereof include a carbon black such as furnace black, channel black, acetylene black and thermal black; an inorganic pigment such as red iron oxide, iron blue and titanium oxide; an azo pigment such as Fast Yellow, Disazo Yellow, Pyrazolone Red, Chelate Red, Brilliant Carmine and Para Brown; a phthalocyanine pigment such as copper phthalocyanine and nonmetal phthalocyanine; a condensation polycyclic pigment such as Flavanthrone Yellow, Dibromoanthrone Orange, Perylene Red, Quinacridone Red and Dioxazine Violet; and various pigments such as Chrome Yellow, Hansa Yellow, Benzidine Yellow, Indanthrene Yellow, Quinoline Yellow, Permanent Orange GTR, Pyrazolone Orange, Vulcan Orange, Watchung Red, Permanent Red, DuPont Oil Red, Lithol Red, Rhodamine B Lake, Lake Red C, Rose Bengal, Aniline Blue, Ultramarine Blue, Carco Oil Blue, Methylene Blue Chloride, Phthalocyanine Blue, Phthalocyanine Green, Malachite Green Oxalate, C.I. Pigment Red 48:1, C.I. Pigment Red 122, C.I. Pigment Red 57:1, C.I. Pigment Yellow 12, C.I. Pigment Yellow 97, C.I. Pigment Yellow 17, C.I. Pigment Blue 15:1 and C.I. Pigment Blue 15:3. One species or a combination of two or more species of these pigments may be used.

[External Additive]

Similarly to the normal toner, an inorganic particle such as silica, alumina, titania and calcium carbonate, or a fine resin particle such as vinyl-based resin, polyester and silicone, may be used as a flowability aid or a cleaning aid by adding (externally adding) it in the dry state under shearing to the surface of the toner after drying.

[Surfactant]

Examples of the surfactant for use in the present invention include an anionic surfactant such as sulfate salt type, sulfonate type, phosphoric ester type and soap type; and a cationic surfactant such as amine salt type and quaternary ammonium salt type. It is also effective to use a nonionic surfactant in combination, such as polyethylene glycol type, alkylphenol ethylene oxide adduct type and polyhydric alcohol type. As for the dispersing unit, a general device such as rotation shearing homogenizer and media-containing ball mill, sand mill or dynomill, may be used.

<Property of Electrostatic Image Developing Toner>

The toner of the present invention preferably has a volume average particle diameter (D50) of about 3.0 μm to about 20.0 μm. The volume average particle diameter is more preferably from about 3.0 μm to about 9.0 μm. When $D_{50}$ is 3.0 μm or more, this is advantageous in that an appropriate adherence is obtained and the developability does not decrease. Also, when $D_{50}$ is 9.0 μm or less, sufficiently high image resolution is obtained and this is preferred. The volume average particle diameter ($D_{50}$) can be measured using a laser diffraction-type particle size distribution measuring apparatus or the like.

Furthermore, the toner of the present invention preferably has a volume average particle size distribution GSDv of about 1.4 or less. Particularly, in the case of a chemical process toner, GSDv is more preferably about 1.3 or less.

After a cumulative distribution of each volume is drawn from the small diameter side with respect to the particle size range (channel) divided on the basis of particle size distribution, the particle diameter at 16% accumulation is defined as $D_{16V}$ by volume and the particle diameter at 84% accumulation is defined as $D_{84V}$ by volume. Using these, the volume average particle size distribution (GSDv) is calculated according to the following formula:

$$\text{Volume average particle size distribution GSDv} = (D_{84V}/D_{16V})^{0.5}$$

The GSDv is preferably 1.4 or less not only in that uniform particle diameter and good fixability are obtained and the apparatus is free from a trouble ascribable to fixing failure but also in that scattering of the toner causing contamination in the apparatus or deterioration of the developer does not occur.

The volume average particle size distribution GSDv can be measured by using a laser diffraction-type particle size distribution measuring apparatus or the like.

In the case of producing the toner of the present invention by a chemical production process, from the standpoint of image forming property, the shape factor SF1 is preferably from about 100 to about 140, more preferably from about 110 to about 135. At this time, SF1 is calculated as follows.

$$SF1 = \frac{(ML)^2}{A} \times \frac{\pi}{4} \times 100$$

In the formula, ML is the absolute maximum length of the particle, and A is the projected area of the particle.

These are quantified mainly by inputting a microscopic image or a scanning electron microscopic image into a Luzex image analyzer and analyzing the image.

—Electrostatic Image Developer—

The electrostatic image developing toner of the present invention is used as an electrostatic image developer. This developer is not particularly limited except for containing the electrostatic image developing toner and may take an appropriate component composition according to the purpose. When the electrostatic image developing toner is used alone, the developer is prepared as a one-component electrostatic image developer, and when the toner is used in combination with a carrier, the developer is prepared as a two-component electrostatic image developer.

(Carrier)

The carrier is not particularly limited, but examples of the carrier usually employed include a magnetic particle such as iron powder, ferrite, iron oxide powder and nickel; a resin-coated carrier obtained by coating the surface of a magnetic particle as a core material with a resin such as styrene-based resin, vinyl-based resin, ethylene-based resin, rosin-based resin, polyester-based resin and melamine-based resin or with a wax such as stearic acid to form a resin coat layer; and a magnetic material dispersion-type carrier obtained by dispersing magnetic particles in a binder resin. Among these, a resin-coated carrier is preferred because the chargeability of the toner or the resistance of the entire carrier can be controlled by the construction of the resin coat layer.

The mixing ratio between the toner of the present invention and the carrier in the two-component electrostatic image developer is usually from 2 to 10 parts by weight of toner per 100 parts by weight of carrier. The preparation method of the developer is not particularly limited, but examples thereof include a method of mixing the toner and the carrier by a V blender.

—Image Forming Method—

The electrostatic image developing toner and electrostatic image developer of the present invention may be used for an image forming method in a normal electrostatic image developing system (electrophotographic system).

The image forming method of the present invention includes a latent image forming step of forming an electrostatic latent image on the surface of a latent image carrier, a developing step of developing the electrostatic latent image formed on the surface of the latent image carrier with an electrostatic image developer containing a toner to form a toner image, a step of transferring the toner image formed on the surface of the latent image carrier onto the surface of a transfer member, and a fixing step of heat-fixing the toner image transferred to the surface of the transfer member, wherein the electrostatic image developing toner of the present invention is used as the toner or the electrostatic image developer of the present invention is used as the developer.

The above-described steps all may utilize the steps known in the image forming method, and these steps are describe, for example, in JP-A-56-40868 and JP-A-49-91231. Also, the image forming method of the present invention may include a step other than those steps, and preferred examples of such a step include a cleaning step of removing the electrostatic image developer remaining on the electrostatic latent image carrier. In a preferred embodiment, the image forming method of the present invention further includes a recycling step. This recycling step is a step of transferring the electrostatic image developing toner collected in the cleaning step to the developer tank. The image forming method in this embodiment including a recycling step can be performed using an image forming apparatus such as toner recycling system-type copying machine or facsimile machine. The image forming method of the present invention may also be applied to a recycling system where the cleaning step is omitted and the toner is collected simultaneously with the development.

As for the latent image carrier, for example, an electrophotographic photoreceptor or a dielectric recording material may be used.

In the case of an electrophotographic photoreceptor, the surface of the electrophotographic photoreceptor is uniformly charged by a corotron charging device, a contact charging device or the like and then exposed to form an electrostatic latent image (latent image forming step) Subsequently, the photoreceptor is put into contact with or proximity to a developing roll having formed on the surface thereof a developer layer, whereby toner particles are attached to the electrostatic latent image to form a toner image on the electrophotographic photoreceptor (developing step). The toner image formed is transferred to the surface of a transfer member such as paper with or without intervention of an intermediate transfer member by using a corotron charging device or the like (transfer step). Furthermore, the toner image transferred to the surface of the transfer member is fixed using a fixing machine, for example, by applying heat, pressure, or heat and pressure or by solvent fixing to form a final toner image (fixing step).

At the heat-fixing by a fixing machine, a releasing agent is usually fed to the fixing member of the fixing machine so as to prevent offset or the like.

—Image Forming Apparatus—

The image forming apparatus of the present invention includes a latent image carrier, an electrically charging unit for electrically charging the latent image carrier, an exposure unit for exposing the electrically charged latent image carrier to form an electrostatic latent image on the latent image carrier, a developing unit for developing the electrostatic latent image with a developer containing a toner to form a toner image, and a transfer unit for transferring the toner image onto a recording material from the latent image carrier, wherein the toner is the toner of the present invention or the developer is the developer of the present invention.

The image forming apparatus includes, if desired, a fixing unit for fixing the toner image on the fixing substrate. In the transfer unit, transfer may be performed twice or more by using an intermediate transfer member.

For the electrostatic latent image carrier and units described above, the constructions described above in respective steps of the image forming method can be preferably used.

Also, for all of the units described above, a unit known in the image forming apparatus can be utilized. The image forming apparatus of the present invention may include a unit, an apparatus and the like other that the above-described constructions. Furthermore, in the image forming apparatus of the present invention, a plurality of operations out of operations in those units may be performed at the same time.

EXAMPLES

The present invention is described in greater detail below by referring to Examples and Comparative Examples, but the present invention is not limited to these Examples.

The materials of the electrostatic image developing toner used in the present invention and their abbreviations are as follows.

| | |
|---|---|
| CHDA: | 1,4-cyclohexanedicarboxylic acid |
| PAH: | phthalic anhydride |
| PDAA: | 1,4-phenylenediacetic acid |
| TPA: | terephthalic acid |
| DDA: | 1,12-dodecanoic diacid |
| BisA-2EO: | bisphenol A-ethylene oxide 2 mol adduct (2 mol adduct in terms of both terminals) |
| BisA-2PO: | bisphenol A-propylene oxide 2 mol adduct (2 mol adduct in terms of both terminals) |
| ADD: | 1,5-adamantanediol |
| CHDM: | 1,4-cyclohexanedimethanol |
| DBSA: | dodecylbenzenesulfonic acid |
| PDBSA: | pentadecylbenzenesulfonic acid |
| ODBSA: | octadecylbenzenesulfonic acid (produced by Tayca Corp.) |

(Measuring Method)
<Measuring Method of Molecular Weight>

As for the measurement of the molecular weight, the weight average molecular weight Mw and the number average molecular weight Mn are measured by gel permeation chromatography (GPC) under the conditions described below. The measurement is performed at a temperature of 40° C. by flowing a solvent (tetrahydrofuran) at a flow velocity of 1.2 ml/min and injecting 3 mg as the sample weight of a tetrahydrofuran sample solution in a concentration of 0.2 g/20 ml. At the measurement of the molecular weight of the sample, the measurement conditions are selected such that the molecular weight of the sample is included in the range where a straight line is formed by a logarithm of the molecular weight in the calibration curve created from several kinds of monodisperse polystyrene standard samples and a counted number.

The reliability of the measurement results can be confirmed from the fact that the molecular weight of an NBS706 polystyrene standard sample measured under the above-described conditions becomes:

weight average molecular weight $Mw = 28.8 \times 10^4$ number average molecular weight $Mn = 13.7 \times 10^4$ As for the column of GPC, TSK-GEL, GMH (produced by Tosoh Corp.) is used.

<Measuring Method of Glass Transition Temperature>

The glass transition temperature Tg of the polyester is measured using a differential scanning calorimeter (DSC50, manufactured by Shimadzu Corp.).

More specifically, the measurement is performed by a method where the temperature is elevated at 10° C./min from 0° C. to 150° C., held at 150° C. for 10 minutes, then lowered at 10° C./min from 150° C. to –10° C., held at –10° C. for 10 minutes, and thereafter elevated at 10° C./min from –10° C. to 150° C. In the present invention, an on-set value in the differential scanning heat distribution curve at the second temperature rise time is used as the glass transition temperature.

<Measuring Method of Metal Element Amount>

The pulverized product (6 g) of the synthesized resin is press-molded using a pressure molding device under the conditions of a load of 10 t and a pressure time of 1 minute to prepare a sample for measurement. As for the measuring apparatus, a fluorescent X-ray analyzer (XRF-1500, manufactured by Shimadzu Corp.) is used under the measuring conditions of a tube voltage of 40 kV, a tube current of 90 mA and a measuring time of 30 minutes.

<Median Diameter>

The median diameter of the resin particle liquid dispersion for use in the present invention is measured, for example, by a laser diffraction-type particle size distribution measuring apparatus (LA-920, manufactured by Horiba Ltd.).

<Toner Particle Diameter, $GSD_v$, SF1>

The particle diameter of the toner particle is measured by a Coulter counter. Also, the shape factor SF1 is determined by observing the shape on Luzex.

Example 1

| | |
|---|---|
| CHDA (Tm = 165° C.) | 12.5 mol % |
| Phthalic anhydride (Tm = 130° C.) | 37.5 mol % |
| BisA-2EO (Tm = 110° C.) | 40 mol % |
| BisA-2PO (Tm = 0° C.) | 10 mol % |
| DBSA (produced by Tayca Corp./Tm = 58° C.) (based on polycondensation component) | 0.1 mol % |

These materials are mixed and charged into a reactor equipped with a stirrer, the monomer and catalyst are dissolved at 140° C. in a nitrogen atmosphere and after reducing the pressure, polycondensation is performed for 36 hours.

The obtained polyester resin is pale yellow and is found to have a molecular weight Mw of 15,000 and a Tg of 59° C. The catalyst-derived metal is not detected.

Example 2

| | |
|---|---|
| CHDA (Tm = 165° C.) | 12.5 mol % |
| Phthalic anhydride (Tm = 130° C.) | 37.5 mol % |
| BisA-2EO (Tm = 110° C.) | 50 mol % |
| Lipase (derived in *Pseudomonas* group, Tm = 0) (based on polycondensation component) | 0.2 mol % |

These materials are mixed and charged into a reactor equipped with a stirrer, the monomer and catalyst are dissolved at 120° C. in a nitrogen atmosphere, and polycondensation is performed for 80 hours.

The obtained polyester resin is milky white and is found to have a molecular weight Mw of 10,800 and a Tg of 51° C. The catalyst-derived metal is not detected.

Example 3

| | |
|---|---|
| CHDA (Tm = 165° C.) | 20 mol % |
| Phthalic anhydride (Tm = 130° C.) | 30 mol % |
| BisA-2EO (Tm = 110° C.) | 40 mol % |
| BisA-2PO (Tm = 0° C.) | 10 mol % |
| DBSA (produced by Tokyo Kasei Kogyo Co., Ltd./melting temperature: 0° C. or less) (based on polycondensation component) | 0.4 mol % |

These materials are mixed and charged into a reactor equipped with a stirrer, the monomer and catalyst are dissolved at 150° C. in a nitrogen atmosphere, and polycondensation is performed for 48 hours.

The obtained polyester resin is pale yellow and is found to have a molecular weight Mw of 11,000 and a Tg of 54° C. The catalyst-derived metal amount is not detected.

Example 4

| | |
|---|---|
| 1,4-Phenylenediacetic acid (Tm = 175° C.) | 35 mol % |
| Terephthalic acid (Tm = 300° C.) | 15 mol % |
| BisA-2EO (Tm = 110° C.) | 25 mol % |
| BisA-2PO (Tm = 0° C.) | 25 mol % |
| Pentadecylbenzenesulfonic acid (Tm = 64° C.) (based on polycondensation component) | 0.5 mol % |

These materials are mixed and charged into a reactor equipped with a stirrer, the monomer and catalyst are dissolved at 150° C. in a nitrogen atmosphere, and polycondensation is performed for 50 hours.

The obtained polyester resin is dark yellow and is found to have a molecular weight Mw of 10,800 and a Tg of 53° C. The catalyst-derived metal amount is not detected.

Example 5

| | |
|---|---|
| Cyclohexanedicarboxylic acid (Tm = 160° C.) | 12.5 mol % |
| Phthalic anhydride (Tm = 130° C.) | 37.5 mol % |
| 1,5-Adamantanediol (Tm = 250° C.) | 48 mol % |
| BisA-2PO (Tm = 0° C.) | 2 mol % |
| Octadecylbenzenesulfonic acid (Tm = 71° C.) (based on polycondensation component) | 0.2 mol % |

These materials are mixed and charged into a reactor equipped with a stirrer, the monomer and catalyst are dissolved at 155° C. in a nitrogen atmosphere, and polycondensation is performed for 50 hours.

The obtained polyester resin is dark yellow and is found to have a molecular weight Mw of 12,300 and a Tg of 50° C. The catalyst-derived metal amount is not detected.

Example 6

| | |
|---|---|
| CHDA (Tm = 160° C.) | 40 mol % |
| Phthalic anhydride (Tm = 130° C.) | 10 mol % |
| BisA-2EO (Tm = 110° C.) | 40 mol % |
| BisA-2PO (Tm = 0° C.) | 10 mol % |
| DBSA (produced by Tayca Corp./melting temperature: 58° C.) (based on polycondensation component) | 0.2 mol % |

These materials are mixed and charged into a reactor equipped with a stirrer, the monomer and catalyst are dissolved at 140° C. in a nitrogen atmosphere and after reducing the pressure, polycondensation is performed for 36 hours.

The obtained polyester resin is pale yellow and is found to have a molecular weight Mw of 15,000 and a Tg of 47° C. The catalyst-derived metal is not detected.

Comparative Example 1

| | |
|---|---|
| CHDA (Tm = 160° C.) | 12.5 mol % |
| Phthalic anhydride (Tm = 130° C.) | 37.5 mol % |
| BisA-2EO (Tm = 110° C.) | 40 mol % |
| BisA-2PO (Tm = 0° C.) | 10 mol % |
| Dibutyltin oxide (Tm = 300° C.) (based on polycondensation component) | 0.2 mol % |

These materials are mixed and charged into a reactor equipped with a stirrer, the monomer and catalyst are dissolved at 230° C. in a nitrogen atmosphere and after reducing the pressure, polycondensation is performed for 24 hours.

The obtained polyester resin is dark yellow and is found to have a molecular weight Mw of 15,000 and a Tg of 59° C. The catalyst-derived metal amount is found to be 130 ppm.

Comparative Example 2

| | |
|---|---|
| CHDA (Tm = 160° C.) | 12.5 mol % |
| 1,12-Dodecanoic diacid (Tm = 128° C.) | 37.5 mol % |
| BisA-2EO (Tm = 110° C.) | 50 mol % |
| DBSA (produced by Tayca Corp./Tm = 58° C.) (based on polycondensation component) | 0.2 mol % |

These materials are mixed and charged into a reactor equipped with a stirrer, the monomer and catalyst are dissolved at 140° C. in a nitrogen atmosphere and after reducing the pressure, polycondensation is performed for 19 hours.

The obtained polyester resin is milky white and is found to have a molecular weight Mw of 14,300 and a Tg of 35° C. The catalyst-derived metal is not detected.

Comparative Example 3

| | |
|---|---|
| CHDA (Tm = 165° C.) | 40 mol % |
| Phthalic anhydride (Tm = 130° C.) | 10 mol % |
| CHDM (Tm = 110° C.) | 50 mol % |
| DBSA (produced by Tayca Corp./Tm = 58° C.) (based on polycondensation component) | 0.2 mol % |

These materials are mixed and charged into a reactor equipped with a stirrer, the monomer and catalyst are dissolved at 150° C. in a nitrogen atmosphere and after reducing the pressure, polycondensation is performed for 28 hours.

The obtained polyester resin is milky white and is found to have a molecular weight Mw of 14,000 and a Tg of 42° C. The catalyst-derived metal amount is not detected.

<Preparation of Resin Particle Liquid Dispersion (1)>

The resin obtained in Example 1 is weighed 30 parts and charged into a reactor equipped with a stirrer and after adding 0.24 parts of triethylamine, the blend is stirred at 100° C. for 10 minutes.

Thereafter, 45 parts of ion-exchanged water heated to 90° C. is added to the resin, and stirring is continued for 2 hours to obtain Resin Particle Liquid Dispersion (1). The resin particle diameter is measured by a laser diffraction-type particle size distribution measuring apparatus (LA-920, manufactured by Horiba Ltd.). Also, the solid content concentration of the resin particle is adjusted to 20 wt %.

Similarly, Resin Particle Liquid Dispersions (2) to (9) using the resins obtained in Examples 2 to 6 and Comparative Examples 1 to 3, respectively, are prepared. The particle size of each resin is shown in Table 1.

(Production of Toner)

<Preparation of Releasing Agent Particle Liquid Dispersion (W1)>

| | |
|---|---|
| Polyethylene wax (Polywax 7252, produced by Toyo-Petrolite K.K., melting temperature: 103° C.) | 30 parts by weight |
| Cationic surfactant (Sanizol B50, produced by Kao Corp.) | 3 parts by weight |
| Ion-exchanged water | 67 parts by weight |

These components are thoroughly dispersed by a homogenizer (Ultraturrax T50, manufactured by IKA Works, Inc.) under heating at 95° C. and then dispersed by a pressure jet-type homogenizer (Gaulin Homogenizer, manufactured by Gaulin) to prepare Releasing Agent Particle Liquid Dispersion (W1). The number average particle diameter D50n of releasing agent fine particles in the obtained liquid dispersion is 460 nm. Thereafter, ion-exchanged water is added to adjust the solid content concentration of the liquid dispersion to 30%.

<Preparation of Cyan Pigment Liquid Dispersion>

| | |
|---|---|
| Cyan pigment (PB 15:3, produced by Dainichiseika Colour & Chemicals Mfg. Co., Ltd.) | 20 parts by weight |
| Anionic surfactant (Neogen R, produced by Dai-ichi Kogyo Seiyaku Co., Ltd.) | 2 parts by weight |
| Ion-exchanged water | 78 parts by weight |

These components are mixed and dissolved, and the resulting solution is dispersed by a homogenizer (Ultraturrax, manufactured by IKA Works, Inc.) for 5 minutes and further by an ultrasonic bath for 10 minutes to obtain a cyan pigment liquid dispersion. The number average particle diameter D50n of the pigment in the liquid dispersion is 120 nm. Thereafter, ion-exchanged water is added to adjust the solid content concentration of the liquid dispersion to 20%.

<Preparation of Resin Particle Liquid Dispersion A: Non-Crystalline Vinyl-Based Resin Latex)

| | |
|---|---|
| Styrene | 460 parts by weight |
| n-Butyl acrylate | 140 parts by weight |
| Acrylic acid | 12 parts by weight |
| Dodecanethiol | 9 parts by weight |

These components are mixed and dissolved to prepare a solution.

Also, 12 parts by weight of an anionic surfactant (Dowfax, produced by Rhodia, Inc.) is dissolved in 250 parts by weight of ion-exchanged water and after adding the solution prepared above, the blend is dispersed and emulsified in a flask (Monomer Emulsion A).

Furthermore, 1 part by weight of the same anionic surfactant (Dowfax, produced by Rhodia, Inc.) is dissolved in 555 parts by weight of ion-exchanged water, and the resulting solution is charged into a polymerization flask.

The polymerization flask is tightly plugged and after a reflux tube is equipped, the polymerization flask is heated to 75° C. on a water bath with gentle stirring while injecting nitrogen and kept in this state.

Subsequently, 9 parts by weight of ammonium persulfate is dissolved in 43 parts by weight of ion-exchanged water, the resulting solution is added dropwise into the polymerization flask through a metering pump over 20 minutes, and then Monomer Emulsion A is added dropwise through a metering pump over 200 minutes.

Thereafter, the polymerization flask is kept at 75° C. for 3 hours while continuing gentle stirring to complete the polymerization.

In this way, Anionic Resin Particle Liquid Dispersion A having a fine particle median diameter of 290 nm, a glass transition temperature of 52.0° C., a weight average molecular weight of 30,000 and a solid content of 42% is obtained.

Toner Example 1

Production of Toner Using Polyester of Example 1

(Production of Cyan Toner (Toner C1))

| | |
|---|---|
| Resin Particle Liquid Dispersion (1) | 50 parts by weight (solid content: 10 parts by weight) |
| Resin Particle Liquid Dispersion A | 90 parts by weight |
| Cyan Pigment Liquid Dispersion (C1) | 60 parts by weight |
| Aqueous 10 wt % polyaluminum chloride solution (PAC1000W, produced by Asada Chemical Industry Co., Ltd.) | 15 parts by weight |
| Aqueous 1% nitric acid solution | 3 parts by weight |

These components are dispersed in a stainless steel-made round flask by using a homogenizer (Ultraturrax T50, manufactured by IKA Works, Inc.) at 5,000 rpm for 3 minutes and then, a lid equipped with a stirrer having magnetic seal, a thermometer and a pH meter is put on the flask. Thereafter, a mantle heater for heating is set, and the flask is heated to 62° C. at a rate of 1° C./min with stirring at a minimum rotation number appropriately controlled to allow for stirring of the entire liquid dispersion in the flask. After keeping the system at 62° C. for 30 minutes, the particle diameter of the aggregate particle is confirmed by a Coulter counter (TA II, manufactured by Nikkaki). Immediately after the temperature rise is stopped, 50 parts by weight of Resin Particle Liquid Dispersion A is added, and this condition is kept for 30 minutes. Furthermore, an aqueous sodium hydroxide solution is added until the pH of the system becomes 6.5, and the blend is heated to 97° C. at 1° C./min. After the temperature rise, an aqueous nitric acid solution is added to adjust the pH of the system to 5.0, and this condition is kept for 10 hours for heat-fusing together the aggregate particles. The temperature of the system is then lowered to 50° C., and an aqueous sodium hydroxide solution is added to adjust the pH to 12.0. After keeping the system for 10 minutes, the content is taken out from the flask, thoroughly filtered using ion-exchanged water, washed with flowing water and further dispersed in ion-exchanged water to have a solid content of 10 wt %. Subsequently, a nitric acid is added, and after stirring at a pH of 3.0 for 10 minutes, the dispersion is again thoroughly filtered using ion-exchanged water and washed with flowing water. The obtained slurry is freeze-dried to obtain a cyan toner (Toner C1>. The thus-produced toner is found to have a cumulative volume average particle diameter $D_{50}$ of 5.8 μm, a volume average particle size distribution index GSDv of 1.23, and a toner particle shape factor of 128.

The cumulative volume average particle diameter $D_{50}$ and volume average particle size distribution index GSDv of the toner are measured by a laser diffraction-type particle size distribution measuring apparatus (LA-700, manufactured by Horiba Ltd.), and the shape factor is determined by observing the shape on Luzex.

To this cyan toner, a silica ($SiO_2$) fine particle having an average primary particle diameter of 40 nm subjected to a surface hydrophobing treatment with hexamethyldisilazane (hereinafter, sometimes simply referred to as "HMDS") and a metatitanic acid compound fine particle having an average primary particle diameter of 20 nm as a reaction product of metatitanic acid and isobutyltrimethoxysilane are added each in an amount of 1 wt %. Subsequently, the blend is mixed in a Henschel mixer to produce a cyan external addition toner.

Furthermore, 5 parts by weight of each of these toners and 100 parts by weight of a resin-coated ferrite particle (average particle diameter: 35 μm) are mixed to prepare a two-component developer.

Toners are produced in the same manner by using the resins in Examples and Comparative Examples. The toner obtained is observed on a scanning electron microscope (SEM) image. The results are shown in Table 1.

Incidentally, when the resin of Comparative Example 2 is used, fusion-bonding of particles occurs during the production of toner, and a toner cannot be obtained.

<Evaluation of Fogging Under High-Temperature High-Humidity Conditions>

In the evaluation of the image quality, an image is formed using a modified machine of Docu Centre Color 500CP manufactured by Fuji Xerox Co., Ltd. at a fixing temperature of 140° C. and a process speed of 240 mm/sec.

The image quality after fixing a fine line image in the modified machine above is evaluated by measuring the non-image area between fine lines by means of a reflection densitometer (X-Rite 404, manufactured by U.S. X-Rite). The image quality is rated C when the reflection density had a density increase of 0.02 or more in the fogging, rated B when the density increase is from 0.01 to less than 0.02, and rated A when 0.01 or less.

The toners obtained are subjected to this evaluation, as a result, when the toners of Examples 1 to 4 are used, fogging is not observed at all and the density increase of the non-image area measured by X-Rite 404 is 0.01 or less.

On the other hand, when the toners of Comparative Examples 1 and 3 are used, a density increase of 0.01 or more is observed at the density measurement of the non-image area by X-Rite 404 and slight generation of fogging is recognized even with an eye.

<Heat Resistance>

In the evaluation of heat resistance, 10 sheets of the obtained toner image are piled one on another, and the stack is left standing in a high-temperature high-humidity environment for 1 day and then placed in a constant-temperature bath at 42° C. for 7 days while applying a load of 30 g/cm² (2.94 kPa) thereon. Thereafter, troubles such as fall-off and adhesion are observed. Here, the high-temperature high-humidity environment is at a temperature of 28° C. and a humidity of 90%.

The heat resistance is rated as follows.

A: No defect is observed on the image surface at the separation, and the sheets can be separated without feeling uncomfortable.

B: The sheets are separated with adhesive feeling.

C: A defect is generated on the image surface.

<Electric Chargeability>

A: The ratio of the amount of triboelectric charge in a high-temperature high-humidity environment (H/H) to the amount of triboelectric charge in a low-temperature low-humidity environment (L/L) is 0.85 or more.

B: The ratio of the amount of triboelectric charge in a high-temperature high-humidity environment (H/H) to the amount of triboelectric charge in a low-temperature low-humidity environment (L/L) is from 0.70 to less than 0.85.

C: The ratio of the amount of triboelectric charge in a high-temperature high-humidity environment (H/H) to the amount of triboelectric charge in a low-temperature low-humidity environment (L/L) is less than 0.70.

Here, the high-temperature high-humidity environment is at a temperature of 28° C. and a humidity of 90%, and the low-temperature low-humidity environment is at a temperature of 10° C. and a humidity of 30%.

<Evaluation of Color Reproducibility (by Chromoscope)>

Using the machine above, 100 sheets of a cyan color tone sample using each cyan toner prepared above are produced. Arbitrary 10 sheets are extracted from the sample, and the color difference in each tone is compared with the original. In the measurement, X-Rite 404 is used. The color reproducibility with respect to the original in respective tones is averaged and evaluated by the following criteria.

A: Good color reproducibility ($\Delta E < 2.5$) B: Difference from the color of original can be confirmed ($2.5 \leq \Delta E < 4$).

C: Distinctly different from the color of original ($\Delta E \geq 4$).

<Evaluation of Color Reproducibility (with Eye)>

The tone sample produced above is compared with an eye by three panelists, and the color reproducibility with respect to the original is rated by following scores and averaged.

1: Difference from original cannot be recognized.

0.5: Difference from the color of original is perceived.

0: Difference from the color of original can be recognized.

Electrostatic image developing toners and developers are produced in the same manner except for replacing Resin Particle Liquid Dispersion (1) by Resin Particle Liquid. Dispersion (2) to Resin Particle Liquid Dispersion (9) and evaluated in the same manner. The results are shown in Table 1.

TABLE 1

| | | Example 1 | Example 2 | Example 3 |
|---|---|---|---|---|
| Binder Resin | Monomer (Tm (° C.)) | CHDA (165) 12.5 mol % <br> PAH (130) 37.5 mol % <br> Bis-2EO (110) 40 mol % <br> BisA-2PO (0) 10 mol % | CHDA (165) 12.5 mol % <br> PAH (130) 37.5 mol % <br> BisA-2EO (110) 50 mol % | CHDA (165) 20 mol % <br> PAH (130) 30 mol % <br> BisA-2EO (110) 40 mol % <br> BisA-2PO (0) 10 mol % |
| | Catalyst (Tm (° C.)) | DBSA (58) <br> (produced by Tayca) | Lipase (0) <br> (derived in *Pseudomonas* group) | DBSA (0) <br> (Tokyo Kasei) |

TABLE 1-continued

|  |  |  |  |  |
|---|---|---|---|---|
|  | Amount of monomer giving ΔTm < 100° C. (mol %) | 87.5 | 0 | 10 |
|  | Molecular weight (reaction conditions) | 15,000 (140° C., 36 hr) | 10,800 (120° C., 80 hr) | 11,000 (150° C., 48 hr) |
|  | Tg (° C.) | 59 | 51 | 54 |
|  | Color | pale yellow | milky white | pale yellow |
|  | Number average resin particle diameter (nm) | 230 | 190 | 350 |
|  | Amount of catalyst-derived metal (ppm) | 0 | 0 | 0 |
| Toner | $D_{50}$ (μm) | 5.8 | 6 | 5.5 |
|  | $GSD_v$ | 1.23 | 1.24 | 1.31 |
|  | Shape factor | 128 | 123 | 120 |
| Evaluation of Toner | Surface property through SEM | uniform and smooth surface | uniform and smooth surface | slight surface roughness |
|  | Fogging | A | A | A |
|  | Electric charging | A | A | B |
|  | Heat resistance | A | B | A |
|  | Color reproducibility (X-Rite) | A | A | A |
|  | Color reproducibility (with eye) | 1 | 1 | 0.8 |

|  |  | Example 4 | Example 5 | Example 6 |
|---|---|---|---|---|
| Binder Resin | Monomer (Tm (° C.)) | PDAA (175) 35 mol % TPA (300) 15 mol % BisA-2EO (110) 25 mol % BisA-2PO (0) 25 mol % | CHDA (160) 12.5 mol % PAH (130) 37.5 mol % ADD (250) 48 mol % BisA-2PO (0) 2 mol % | CHDA (160) 40 mol % PAH (130) 10 mol % BisA-2EO (110) 40 mol % BisA-2PO (0) 10 mol % |
|  | Catalyst (Tm (° C.)) | PDBSA (64) (Tayca) | ODBSA (71) (Tayca) | DBSA (58) (Tayca) |
|  | Amount of monomer giving ΔTm < 100° C. (mol %) | 50 | 52 | 60 |
|  | Molecular weight (reaction conditions) | 10,800 (150° C., 50 hr) | 12,300 (155° C., 50 hr) | 15,000 (140° C., 36 hr) |
|  | Tg (° C.) | 53 | 50 | 47 |
|  | Color | dark yellow | dark yellow | pale yellow |
|  | Number average resin particle diameter (nm) | 310 | 250 | 170 |
|  | Amount of catalyst-derived metal (ppm) | 0 | 0 | 0 |
| Toner | $D_{50}$ (μm) | 5.7 | 5.6 | 7.8 |
|  | $GSD_V$ | 1.26 | 1.27 | 1.29 |
|  | Shape factor | 126 | 125 | 110 |
| Evaluation of Toner | Surface property through SEM | slight surface roughnesss | slight surface roughness | uniform and smooth surface |
|  | Fogging | A | B | B |
|  | Electric charging | A | A | A |
|  | Heat resistance | A | A | B |
|  | Color reproducibility (X-Rite) | B | B | B |
|  | Color reproducibility (with eye) | 0.7 | 0.7 | 1 |

|  |  | Comparative Example 1 | Comparative Example 2 | Comparative Example 3 |
|---|---|---|---|---|
| Binder Resin | Monomer (Tm (° C.)) | CHDA (160) 12.5 mol % PAH (130) 37.5 mol % BisA2-2EO (110) 40 mol % BisA-2PO (0) 10 mol % | CHDA (160) 12.5 mol % DDA (128) 37.5 mol % BisA-2EO (110) 50 mol % | CHDA (165) 40 mol % PAH (130) 10 mol % CHDM (110) 50 mol % |
|  | Catalyst (Tm (° C.)) | dibutyl tin oxide (300) | DBSA (58) (Tayca) | DBSA (58) (Tayca) |
|  | Amount of monomer giving ΔTm < 100° C. (mol %) | 0 | 87.5 | 60 |
|  | Molecular weight (reaction conditions) | 15,000 (230° C., 24 hr) | 14,300 (140° C., 19 hr) | 14,000 (150° C., 23 hr) |
|  | Tg (° C.) | 59 | 35 | 42 |
|  | Color | dark yellow | milky white | milky white |
|  | Number average resin particle diameter (nm) | 240 | 170 | 180 |
|  | Amount of catalyst-derived metal (ppm) | 130 | 0 | 0 |
| Toner | $D_{50}$ (μm) | 7.5 | Toner is not formed. | 7.5 |
|  | $GSD_V$ | 1.35 | Toner is not formed. | 1.3 |
|  | Shape factor | 112 | Toner is not formed. | 111 |

TABLE 1-continued

| Evaluation of Toner | Surface property through SEM | surface roughness, voids | Toner is not formed, | uniform and smooth surface |
|---|---|---|---|---|
| | Fogging | C | " | C |
| | Electric charging | C | " | C |
| | Heat resistance | A | " | C |
| | Color reproducibility (X-Rite) | C | " | A |
| | Color reproducibility (with eye) | 0.3 | " | 1 |

What is claimed is:

1. A binder resin for an electrostatic image developing toner, which is obtained by a polycondensation reaction of at least two polycarboxylic acids and at least one polyol, wherein
the at least two polycarboxylic acids comprise at least one of a polycarboxylic acid represented by formula (1) and a polycarboxylic acid represented by formula (2) in an amount of from about 3 mol % to less than about 45 mol % based on a total amount of the at least two polycarboxylic acids,
the binder resin comprises a catalyst-derived metal in an amount of from about 0 ppm to about 10 ppm,
the binder resin comprises a Brønsted acid catalyst having a melting temperature that is different from melting temperatures of 60 mol % or more of a total of polycarboxylic acids and polyol by less than about 100° C., and
the binder resin has a glass transition temperature Tg of from about 45° C. to about 80° C.:

$$R^1OOCA^1{}_mB^1{}_nA^1{}_lCOOR^{1'} \quad (1)$$

wherein each $A^1$ independently represents a methylene group,
each $B^1$, which may be the same as or different from every other $B^1$, independently represents an aromatic hydrocarbon residue,
each of $R^1$ and $R^{1'}$ independently represents a hydrogen atom or a monovalent hydrocarbon group,
a sum of m and l is from 1 to 12, and
n is from 1 to 3;

$$R^2OOCA^2{}_qB^2{}_rA^2{}_pCOOR^{2'} \quad (2)$$

wherein each $A^2$ independently represents a methylene group,
each $B^2$, which may be the same as or different from every other $B^2$, independently represents an alicyclic hydrocarbon residue,
each of $R^2$ and $R^{2'}$ independently represents a hydrogen atom or a monovalent hydrocarbon group,
p is from 0 to 6,
q is from 0 to 6, and
r is from 1 to 3.

2. The binder resin according to claim 1, wherein the Brønsted acid catalyst comprises at least one selected from the group consisting of a dodecylbenzenesulfonic acid, a pentadecylbenzenesulfonic acid, an octadecylbenzenesulfonic acid, a p-toluenesulfonic acid, and derivatives thereof.

3. The binder resin according to claim 1, wherein the at least one polyol comprises a polyol represented by formula (3) in an amount of from about 3 mol % to about 100 mol % based on a total amount of the at least one polyol:

$$HOX_hY_jX_kOH \quad (3)$$

each X, which may be the same as or different from every other X, independently represents an alkylene oxide group,
each Y, which may be the same as or different from every other Y, represents a bisphenol skeleton residue,
a sum of h and k is from 1 to 10, and
j is from 1 to 3.

4. The binder resin according to claim 3, wherein the at least one polyol further comprises a cyclohexanedimethanol.

5. The binder resin according to claim 3, wherein X in formula (3) represents an ethylene oxide group or a propylene oxide group.

6. The binder resin according to claim 1, wherein the polyol comprises a bisphenol-ethylene oxide adduct and a bisphenol-propylene oxide adduct.

7. The binder resin according to claim 6, wherein a molar ratio of the bisphenol-ethylene oxide adduct to the bisphenol-propylene oxide adduct is from about 0.2:0.8 to about 0.8:0.2.

8. The binder resin according to claim 1, wherein the at least two polycarboxylic acids further comprise a maleic anhydride.

9. The binder resin according to claim 1, wherein the glass transition temperature Tg is from about 50° C. to about 70° C.

10. The binder resin according to claim 1, wherein the binder resin has a weight average molecular weight of from about 5,000 to about 80,000.

11. A binder resin particle liquid dispersion for an electrostatic image developing toner, comprising:
an aqueous medium; and
the binder resin of claim 1 that is dispersed in the aqueous medium.

12. An electrostatic image developing toner comprising:
the binder resin of claim 1.

13. The electrostatic image developing toner according to claim 12, wherein the electrostatic image developing toner has a volume average particle diameter $D_{50}$ of about 3.0 to about 20.0 µm.

14. The electrostatic image developing toner according to claim 12, wherein the electrostatic image developing toner has a volume average particle size distribution GSDv of about 1.4 or less.

15. The electrostatic image developing toner according to claim 12, wherein the electrostatic image developing toner has a shape factor SF1 of from about 100 to about 140.

16. The electrostatic image developing toner according to claim 12, wherein the electrostatic image developing toner has a glass transition temperature Tg of from about 50° C. to about 70° C.

17. The electrostatic image developing toner according to claim 12, wherein the electrostatic image developing toner has a weight average molecular weight of from about 5,000 to about 80,000.

18. An electrostatic image developer comprising:
the electrostatic image developing toner of claim 12; and
a carrier.

19. A production method of an electrostatic image developing toner, comprising:
  forming an electrostatic latent image on a surface of a latent image carrier;
  developing the electrostatic latent image formed on the surface of the latent image carrier with the electrostatic image developer of claim 18 to form a toner image;
  transferring the toner image formed on the surface of the latent image carrier onto a surface of a transfer member; and
  heat-fixing the toner image transferred to the surface of the transfer member.

20. An image forming apparatus comprising:
  a latent image carrier,
  an electrically charging unit that electrically charges the latent image carrier,
  an exposure unit that exposes the electrically charged latent image carrier to form an electrostatic latent image on the latent image carrier,
  a developing unit that develops the electrostatic latent image with the electrostatic image developer of claim 18 to form a toner image, and
  a transfer unit that transfers the toner image onto a recording material from the latent image carrier.

21. A binder resin for an electrostatic image developing toner according to claim 1, wherein the at least two polycarboxylic acids comprise at least one of a polycarboxylic acid represented by formula (1) and a polycarboxylic acid represented by formula (2) in an amount from about 10 mol % to about 40 mol %.

* * * * *